US012496833B2

(12) United States Patent
Ishizawa et al.

(10) Patent No.: US 12,496,833 B2
(45) Date of Patent: Dec. 16, 2025

(54) LIQUID STORAGE CONTAINER AND METHOD OF RECYCLING LIQUID STORAGE CONTAINER

(71) Applicant: SEIKO EPSON CORPORATION, Tokyo (JP)

(72) Inventors: Taku Ishizawa, Matsumoto (JP); Seigo Miyazawa, Shiojiri (JP); Atsushi Kobayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 144 days.

(21) Appl. No.: 18/538,471

(22) Filed: Dec. 13, 2023

(65) Prior Publication Data

US 2024/0198687 A1 Jun. 20, 2024

(30) Foreign Application Priority Data

Dec. 14, 2022 (JP) ................................ 2022-199215

(51) Int. Cl.
*B41J 2/175* (2006.01)

(52) U.S. Cl.
CPC ....... *B41J 2/17553* (2013.01); *B41J 2/17506* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17553; B41J 2/17559; B41J 29/02
See application file for complete search history.

(56) References Cited

U.S. PATENT DOCUMENTS 6,416,152 B1 * 7/2002 Matsuzaki ........... B41J 2/17513 347/19
8,287,108 B2 * 10/2012 Uehara ................ B41J 2/17553 428/411.1
2006/0132555 A1 * 6/2006 Uehara ................ B41J 2/17553 347/85

FOREIGN PATENT DOCUMENTS

JP 2008-273114 A 11/2008

* cited by examiner

*Primary Examiner* — Anh T Vo
(74) *Attorney, Agent, or Firm* — Oliff PLC

(57) ABSTRACT

A liquid storage container includes a casing including multiple recess portions at different portions, and multiple films welded to the casing to close recess portions. The recess portions constitute a liquid storage chamber, and flow path for liquid or air flow. The casing includes a first partition wall that defines a first recess portion among the recess portions and to which a first film is welded, and a second partition wall that defines a second recess portion among the recess portions and to which a second film is welded. A first dimension, which is a dimension of the first partition wall portion protruding toward the first film from a configuration coupled to the first partition wall, is greater than a second dimension, which is a dimension of the second partition wall portion protruding toward the second film from a configuration coupled to the second partition wall.

13 Claims, 15 Drawing Sheets

LIQUID STORAGE CONTAINER AND METHOD OF RECYCLING LIQUID STORAGE CONTAINER

The present application is based on, and claims priority from JP Application Serial Number 2022-199215, filed Dec. 14, 2022, the disclosure of which is hereby incorporated by reference herein in its entirety.

BACKGROUND

1. Technical Field

The present disclosure relates to a liquid storage container and a method of recycling the liquid storage container.

2. Related Art

In related art, there is a technique for filling a used ink cartridge with ink for recycling. In a technique disclosed in JP-A-2008-273114, an ink cartridge including a cover film defining a portion of an outer edge of an ink flow path is refilled with ink. First, a hole is formed in the cover film of the used ink cartridge. An ink pouring nozzle is inserted into an ink pouring hole through the hole formed in the cover film, and an ink storage chamber is refilled with the ink. Thereafter, the hole opened in the cover film is sealed, and the ink cartridge is recycled as a reusable ink cartridge.

Specifically, the following processing is performed when the hole in the cover film is sealed. First, a laminated film having a two-layer structure is placed on the cover film to cover the hole formed in the cover film. The first film of the laminated film is melted by the heat of a heater and bonded onto the cover film. As a result, the laminated film is welded to the cover film to close the hole.

However, in the technique described in JP-A-2008-273114, when the laminated film is welded to the cover film, the upper end surface of the wall of a container body to which the cover film is welded is melted by the heat of the heater. As a result, the upper portion of the wall is crushed in the direction in which the heater presses the laminated film. Therefore, the ink cartridge to which the technique of JP-A-2008-273114 can be applied is limited to an ink cartridge having a configuration in which the upper portion of the wall is allowed to be crushed in a direction in which the laminated film is pressed in the wall to which the cover film is welded and a structure disposed around the wall. However, this point is not taken into consideration in the technique of JP-A-2008-273114. In addition, since the upper portion of the wall to which the cover film is welded is crushed at the time of welding of the laminated film, the refilling of ink and the welding of the laminated film cannot be performed again on the ink cartridge to which the technique of JP-A-2008-273114 is applied.

SUMMARY

According to an aspect of the present disclosure, there is provided a liquid storage container. The liquid storage container includes a casing that includes a plurality of recess portions at different portions, and a plurality of films welded to the casing to close the plurality of recess portions. The plurality of recess portions constitute a liquid storage chamber that stores liquid and a flow path that is coupled to the liquid storage chamber and through which at least one of the liquid and air flows. The casing includes a first partition wall that defines a first recess portion among the plurality of recess portions and to which a first film among the plurality of films is welded, and a second partition wall that defines a second recess portion among the plurality of recess portions and to which a second film among the plurality of films is welded. A first dimension, which is a dimension of a portion of the first partition wall protruding toward the first film from a configuration coupled to the first partition wall, is greater than a second dimension, which is a dimension of a portion of the second partition wall protruding toward the second film from a configuration coupled to the second partition wall.

DESCRIPTION OF EMBODIMENTS

A. First Embodiment

A1. Configuration of Liquid Storage Container

Figure 1:
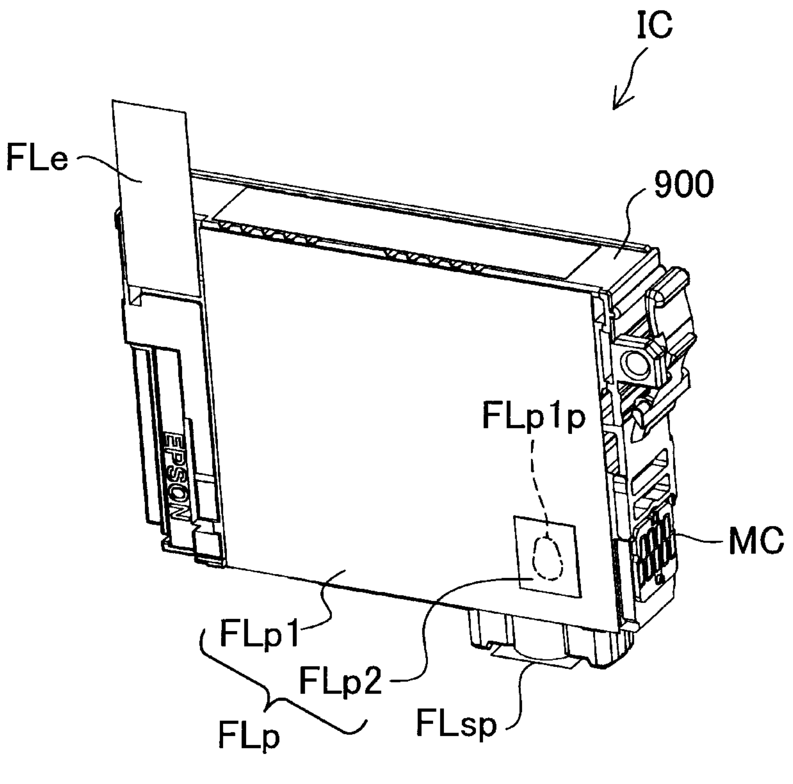
FIG. 1 is a perspective view illustrating a liquid storage container according to the present embodiment.

FIG. 1 is a perspective view illustrating a liquid storage container IC according to the present embodiment. The liquid storage container IC stores ink inside. The liquid storage container IC is mounted in a printer, and supplies ink to the printer from a liquid supply port 200. The liquid storage container IC includes a casing 900 having a rectangular parallelepiped outer shape. The casing 900 is made of polypropylene. The liquid storage container IC includes a memory chip MC on one of the surfaces, which are side surfaces, in a posture when the liquid storage container IC is mounted in the printer and used. The memory chip MC includes a terminal, and is electrically coupled to a circuit of the printer via the terminal. Hereinafter, the names of the "bottom surface" of the casing 900, the "upper surface" of the casing 900, and the "side surface" of the casing 900 are used based on the posture when the casing 900 is mounted in the printer and used.

Figure 2:
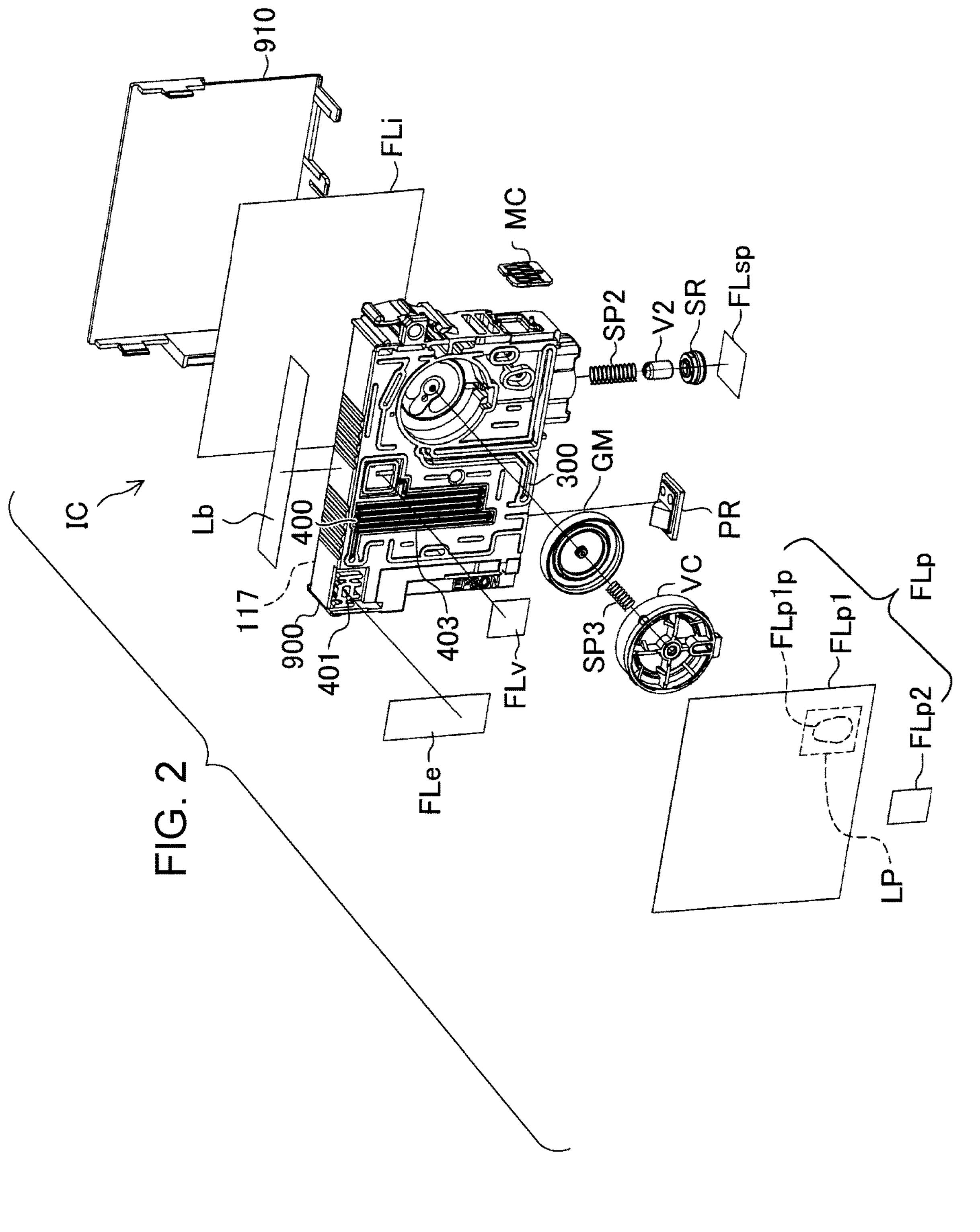
FIG. 2 is an exploded perspective view of the liquid storage container according to the present embodiment.

FIG. 2 is an exploded perspective view of the liquid storage container IC according to the present embodiment. The casing 900 includes a plurality of recess portions at different portions (refer to the center portion in FIG. 2). The plurality of recess portions constitute liquid storage chambers 117 and 121 for storing ink, flow paths 300 and 400, or the like. The flow paths 300 and 400 are coupled to the liquid storage chambers 117 and 121. At least one of ink and air flows through the flow paths 300 and 400. The liquid storage container IC includes a plurality of films FLp, FLpi, FLe, and FLsp welded to the casing 900 to close the plurality of recess portions. In FIG. 2, the liquid storage chambers 117 and 121 are positioned on the back surface side of the casing 900.

The liquid storage container IC includes a rubber film GM, a coil spring SP3, and a valve lid VC inside (refer to a center portion in FIG. 2). The rubber film GM, the coil spring SP3, and the valve lid VC are stacked in this order in the liquid storage container IC to form a differential pressure valve 325. The differential pressure valve 325 will be described later.

The liquid storage container IC includes a coil spring SP2, a valve V2, a sealing rubber SR, and the supply port film FLsp at a portion in the vicinity of a bottom surface of the casing 900 and in the vicinity of a side surface to which the memory chip MC is attached (refer to a center portion in FIG. 2). The coil spring SP2, the valve V2, and the sealing rubber SR are arranged in that order in the liquid supply path 300 in the vicinity of the liquid supply port 200. The supply port film FLsp seals the liquid supply port 200. The supply port film FLsp is peeled off from the casing 900 when the liquid storage container IC is used.

The liquid storage container IC includes a prism PR at a portion on a bottom surface of the casing 900 and in the vicinity of a side surface facing the side surface to which the memory chip MC is attached (refer to a center portion in FIG. 2). A portion of the prism PR is exposed in the liquid storage chamber 121 in the liquid storage container IC. The prism PR provides the printer with information regarding the amount of the ink in the liquid storage chamber 121 by reflecting the light emitted from the printer.

The liquid storage container IC includes an atmosphere opening port 401 at a portion of one side surface of the casing 900, on the side surface coupled to the side surface to which the memory chip MC is attached, and in the vicinity of the side surface facing the side surface to which the memory chip MC is attached (refer to an upper left portion in FIG. 2). The atmosphere opening port 401 is configured to introduce the atmosphere into the liquid storage chambers 117 and 121. The atmosphere opening port 401 is sealed by the peelable sealing film FLe (refer to an upper left portion in FIG. 1). The sealing film FLe does not allow the ink stored in the liquid storage chambers 117 and 121 in the liquid storage container IC to flow.

With such a configuration, in a state before the use of the liquid storage container IC is started, the ink, which flows out from the capturing portion 4C to a portion on the side of the atmosphere opening port 401 in the atmosphere introduction path 400, can also be prevented from flowing out to the outside through the atmosphere opening port 401. The capturing portion 4C will be described later.

The sealing film FLe is peeled off from the casing 900 when the liquid storage container IC is used. That is, the atmosphere opening port 401 is opened. Then, the atmosphere opening port 401 allows air to flow between the outside of the liquid storage container IC and the liquid storage chambers 117 and 121 via the atmosphere introduction path 400. As a result, air is introduced into the liquid storage chambers 117 and 121, and ink is appropriately delivered from the liquid storage chambers 117 and 121 to the liquid supply port 200.

Another portion of one side surface of the casing 900 to which the sealing film FLe is attached is sealed by the partition wall film FLp (refer to lower left portions in FIGS. 1 and 2). In the liquid storage container IC before use, the partition wall film FLp is composed by the first partition wall film FLp1. In a state in which the liquid storage container IC is refilled with the ink after the liquid storage container IC is used, the partition wall film FLp is composed by the first partition wall film FLp1 and the second partition wall film FLp2 (refer to a lower left portion of FIG. 2 and a lower center portion in FIG. 1).

One side surface facing one side surface of the casing 900 to which the sealing film FLe is attached is sealed by an inner film FLi (refer to an upper right portion in FIG. 2). One side surface sealed by the inner film FLi is further covered by the lid 910.

A label Lb is attached to an upper surface of the casing 900 (refer to an upper center portion in FIG. 2). Information indicating the color of ink stored in the liquid storage container IC is printed on the label Lb.

Figure 3:
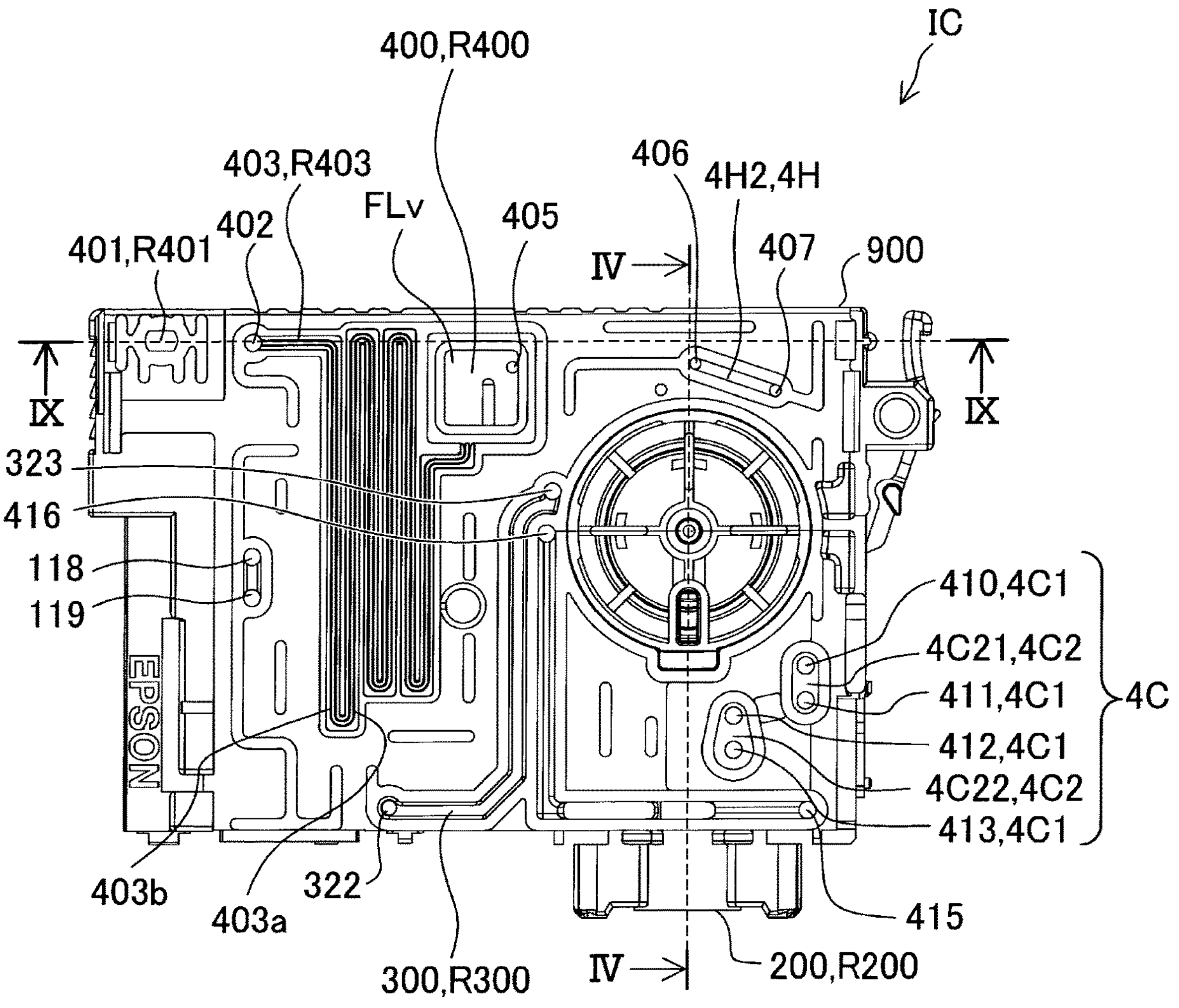
FIG. 3 is a side view of the liquid storage container when viewed from substantially the same direction as FIGS. 1 and 2.
Figure 4:
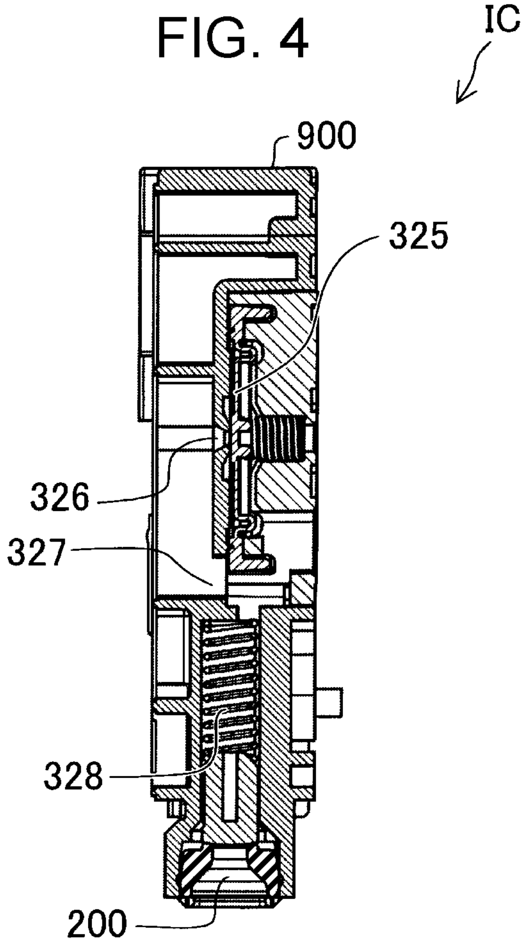
FIG. 4 is a cross-sectional view taken along line IV-IV of FIG. 3.
Figure 5:
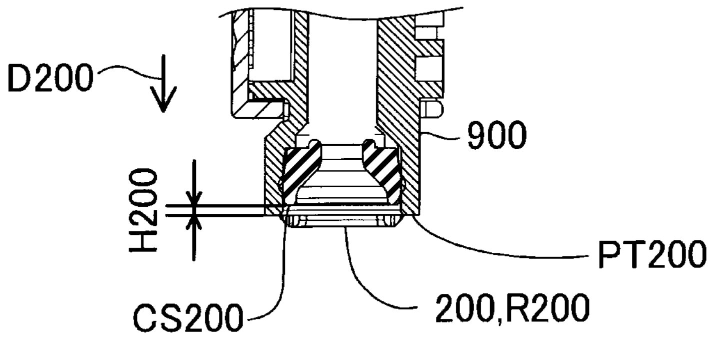
FIG. 5 is an enlarged view illustrating an enlarged portion in the vicinity of a liquid supply port illustrated in FIG. 4.
Figure 6:
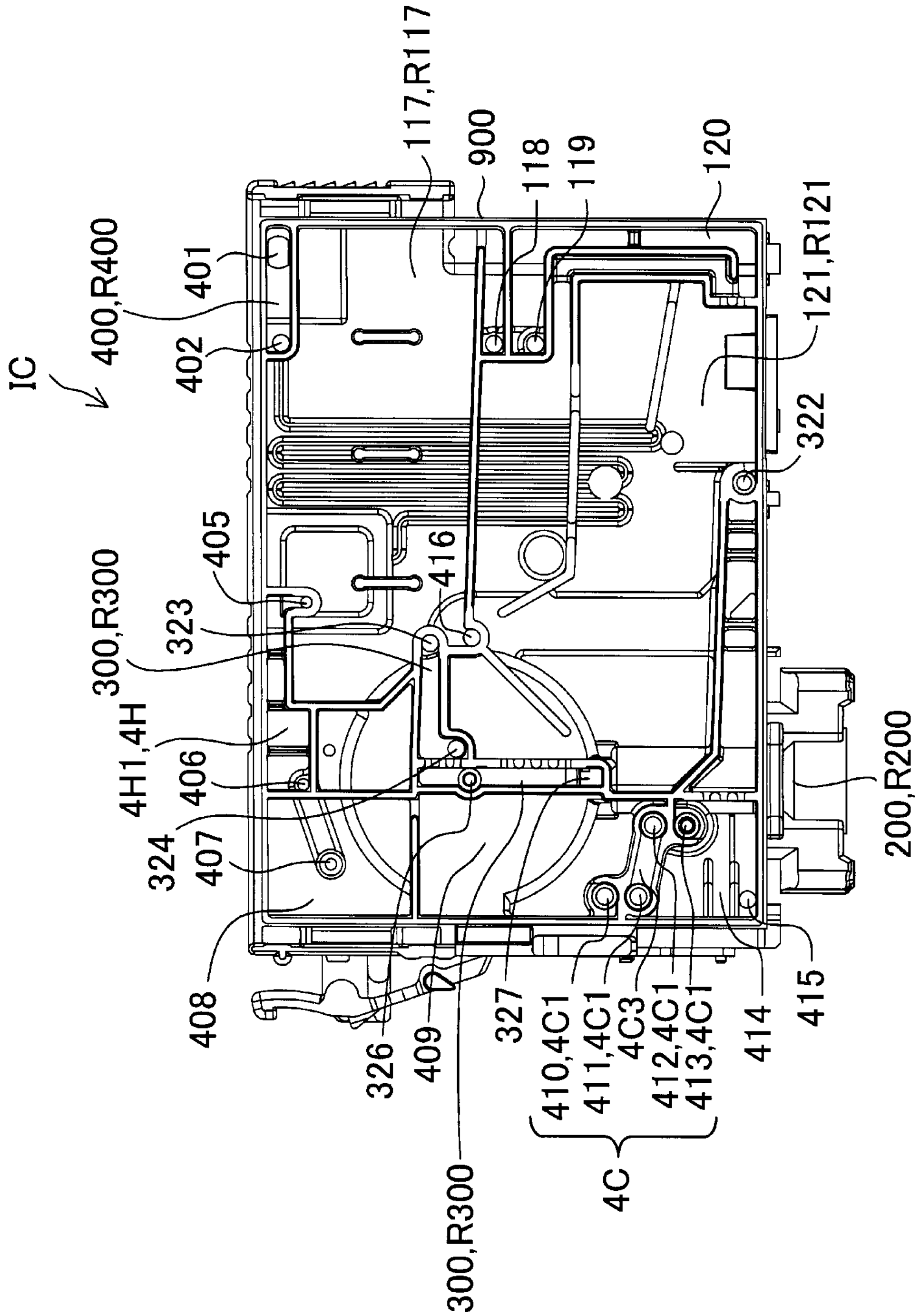
FIG. 6 is a side view of the liquid storage container when viewed in a direction opposite to FIG. 3.
Figure 7:
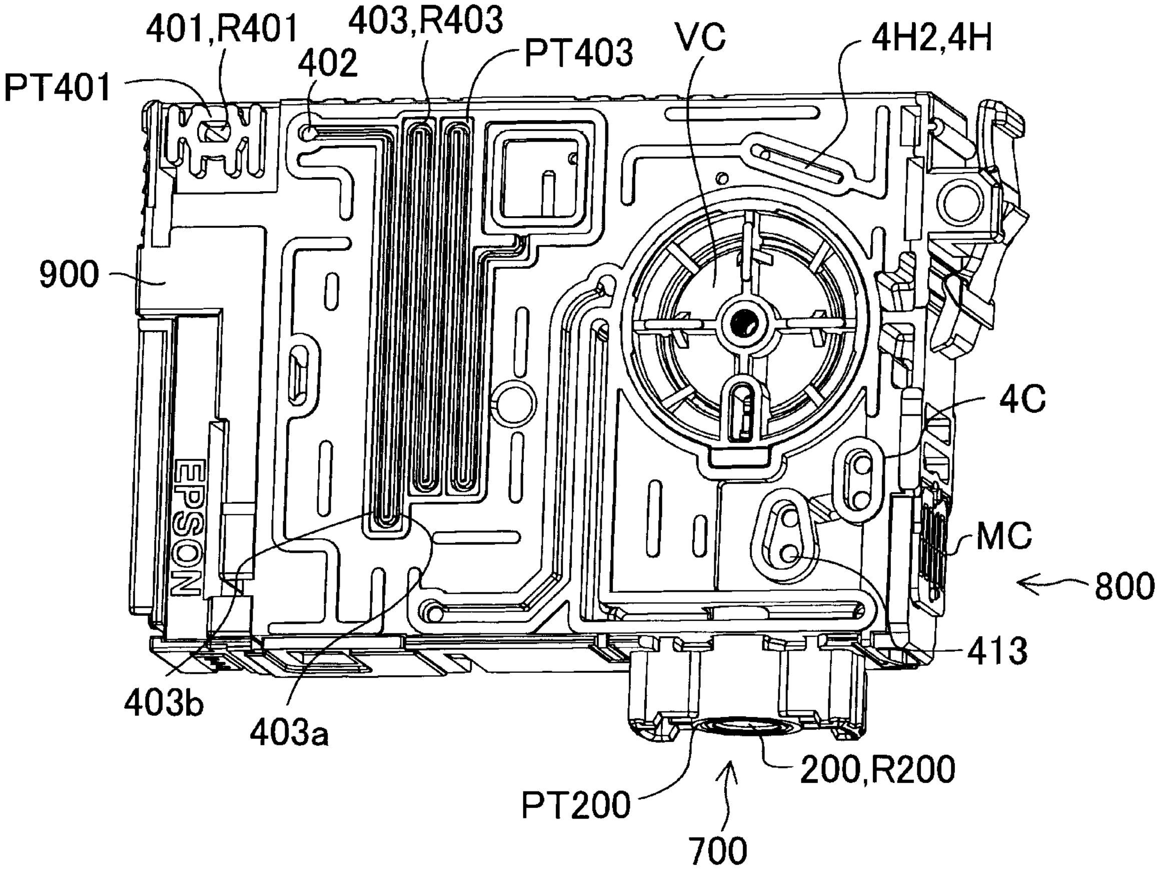
FIG. 7 is a perspective view illustrating the liquid storage container in a state in which a sealing film, a partition wall film, a ventilation film, and a supply port film are not attached.

FIG. 3 is a side view of the liquid storage container IC when viewed from substantially the same direction as FIGS. 1 and 2. FIG. 4 is a cross-sectional view taken along line IV-IV of FIG. 3. FIG. 5 is an enlarged view illustrating an enlarged portion in the vicinity of the liquid supply port 200 illustrated in FIG. 4. FIG. 6 is a side view of the liquid storage container IC when viewed from a direction opposite to FIG. 3. FIG. 7 is a perspective view illustrating the liquid storage container IC in a state in which the sealing film FLe, the partition wall film FLp, the ventilation film FLv, and the supply port film FLsp are not attached.

The liquid storage container IC includes the liquid storage chambers 117 and 121, the liquid supply port 200, the liquid supply path 300, the atmosphere opening port 401, and the atmosphere introduction path 400. The liquid storage chambers 117 and 121 are provided in the casing 900 and store ink (refer to an upper right portion and a lower right portion in FIG. 6). In FIG. 6, recess portions constituting the liquid storage chambers 117 and 121 are illustrated as a recess portion R117 and a recess portion R121, respectively. The liquid storage chambers 117 and 121 are coupled by a communication passage 120 provided in the liquid storage container IC. Specifically, the communication passage 120 allows the ink received from the liquid storage chamber 117 to flow through the flow holes 118 and 119 and supply the ink to the liquid storage chamber 121 (refer to a middle left portion in FIG. 3 and a middle right portion in FIG. 6).

The liquid supply port 200 is provided on the bottom surface of the casing 900 (refer to a lower right portion in FIG. 3, a lower left portion in FIG. 6, and a lower right portion in FIG. 7). In FIGS. 5 to 7, a recess portion constituting the liquid supply port 200 is illustrated as a recess portion R200. The recess portion R200 is defined by a cylindrical partition wall PT200 (refer to a lower portion in FIG. 5 and a lower right portion in FIG. 7). The supply port film FLsp is welded to the partition wall PT200 (refer to a lower right portion in FIG. 2). The liquid supply port 200 supplies ink in the liquid storage chambers 117 and 121 to the outside of the liquid storage container IC.

A dimension of a portion of the partition wall PT200 defining the liquid supply port 200, which protrudes in a direction D200 from a configuration CS200 coupled to the partition wall PT200 on an inner surface of the partition wall PT200 toward the supply port film FLsp, is illustrated as a dimension H200 in FIG. 5 (refer to a lower left portion in FIG. 5). In the present specification, "a configuration B coupled to a configuration A" means that the configuration B is provided to perform a function different from that of the configuration A and the other configuration C provided to perform a function different from that of the configuration A does not exist between the configuration A and the configuration B.

The dimension H200 of the liquid supply port 200 is larger than a dimension H403 of the partition wall PT403 defining the bent flow path portion 403. The dimension H403 of the partition wall PT403 will be described later.

With such a configuration, the liquid storage container IC can be flowed in a state in which the liquid supply port 200 is closed by the supply port film FLsp, and by peeling off the supply port film FLsp from the partition wall PT200, the liquid storage container IC can be used in a state in which ink can be supplied from the liquid storage chambers 117 and 121 to the outside via the liquid supply port 200. Thereafter, by welding the new supply port film FLsp to the partition wall PT200, the liquid supply port 200 can be sealed again, and the liquid storage container IC can be in a state suitable for the flow. Then, by setting the dimension H200 of the partition wall PT200 to a sufficient size, the new supply port film FLsp is welded to the same liquid storage container IC, so that the processing of sealing the liquid supply port 200 can be performed a plurality of times.

The liquid supply path 300 is provided in the casing 900. The liquid supply path 300 couples the liquid supply port 200 to the liquid storage chambers 117 and 121. Specifically, the liquid supply path 300 allows the ink received from the liquid storage chamber 121 to flow through the flow holes 322, 323, 324, 326, and 327 and a flow path portion 328, and supplies the ink to the liquid supply port 200 (refer to a lower center portion and a middle left portion in FIG. 6 and FIG. 4). In FIGS. 3 and 6, a recess portion constituting the liquid supply path 300 is illustrated as a recess portion R300.

The liquid supply path 300 is provided with a differential pressure valve 325 (refer to an upper portion in FIG. 4). The differential pressure valve 325 is composed by a wall portion constituting the casing 900, the rubber film GM, the coil spring SP3, and the valve lid VC. The differential pressure valve 325 allows the liquid supply path 300 to be flowed with ink when the downstream pressure, which is the pressure of the flow path portion in the liquid supply path 300 between the differential pressure valve 325 and the liquid supply port 200 is smaller than the upstream pressure, which is the pressure of the flow path portion in the liquid supply path 300 between the differential pressure valve 325 and the liquid storage chambers 117 and 121 and when the difference between the downstream pressure and the upstream pressure is larger than a predetermined value. The differential pressure valve 325 blocks the liquid supply path 300 when the difference between the downstream pressure and the upstream pressure is smaller than the predetermined value described above or the downstream pressure is larger than the upstream pressure.

With such a configuration, ink can be appropriately supplied from the liquid storage chambers 117 and 121 toward the liquid supply port 200, and flow of ink in the reverse direction can be prevented.

As described above, the atmosphere opening port 401 is provided at a portion on one side surface of the casing 900 and in the vicinity of the side surface facing the side surface to which the memory chip MC is attached (refer to the upper left portion in FIG. 3 and the upper left portion in FIG. 7). The atmosphere opening port 401 introduces the atmosphere into the liquid storage chambers 117 and 121. In FIGS. 3 and 7, the recess portion constituting the atmosphere opening port 401 is illustrated as a recess portion R401. The recess portion R401 is defined by the partition wall PT401. The sealing film FLe is welded to the partition wall PT401 (refer to the upper left portion in FIG. 2).

Figure 8:
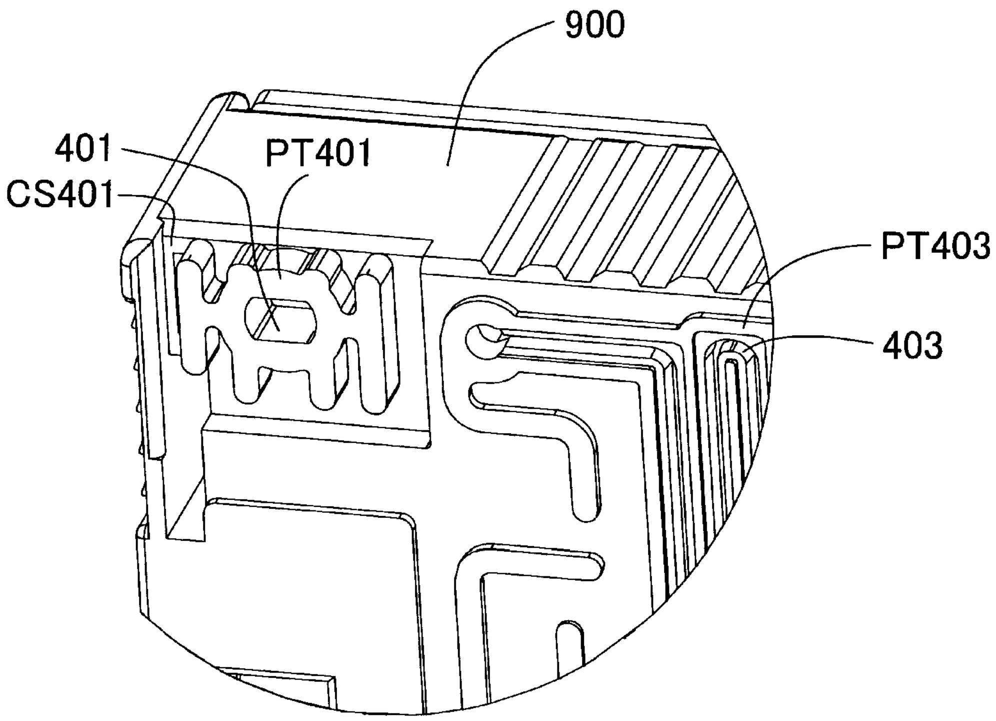
FIG. 8 is an enlarged view illustrating an enlarged portion in the vicinity of an atmosphere opening port illustrated in FIG. 7.
Figure 9:
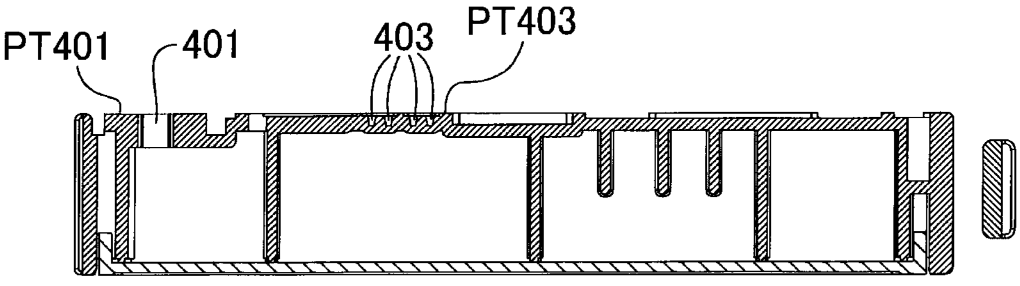
FIG. 9 is a cross-sectional view taken along line IX-IX in FIG. 3.
Figure 10:
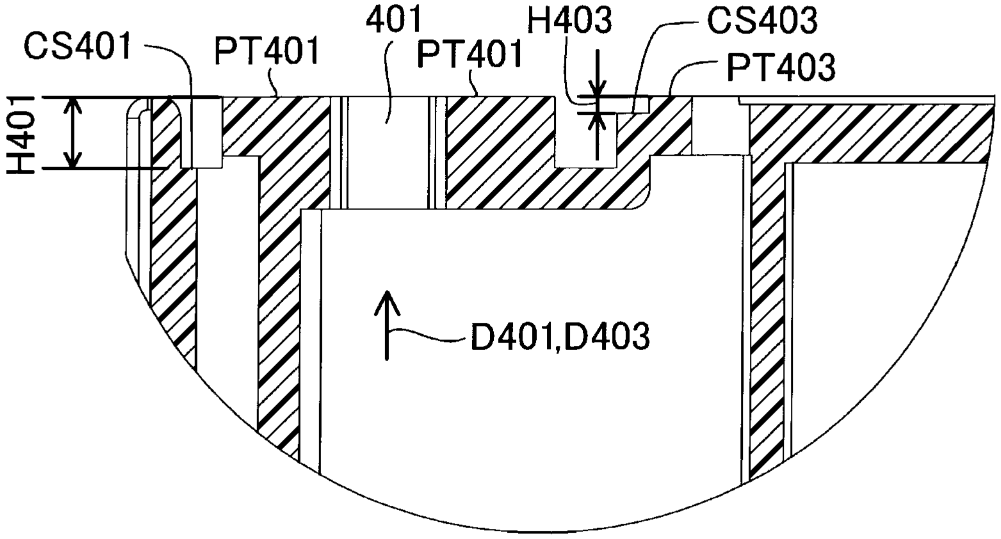
FIG. 10 is an enlarged view illustrating an enlarged portion in the vicinity of the atmosphere opening port illustrated in FIG. 9.

FIG. 8 is an enlarged view illustrating an enlarged portion in the vicinity of the atmosphere opening port 401 illustrated in FIG. 7. FIG. 9 is a cross-sectional view taken along line IX-IX in FIG. 3. FIG. 10 is an enlarged view illustrating an enlarged portion in the vicinity of the atmosphere opening port 401 illustrated in FIG. 9.

In FIG. 10, a dimension of a portion of the partition wall PT401 defining the atmosphere opening port 401, which protrudes in a direction D401 from a configuration CS401 coupled to the partition wall PT401 toward the sealing film FLe, is illustrated as a dimension H401. In order to facilitate understanding of the technique, in FIGS. 8 to 10, the sealing film FLe is not illustrated (refer to FIG. 2).

In FIG. 10, a dimension of a portion of the partition wall PT403 defining the bent flow path portion 403, which protrudes in a direction D403 from a configuration CS403 coupled to the partition wall PT403 toward the first partition wall film FLp1, is illustrated as the dimension H403.

The dimension H401 of the partition wall PT401 defining the atmosphere opening port 401 is larger than the dimension H403 of the partition wall PT403 defining the bent flow path portion 403 (refer to FIG. 10).

With such a configuration, it is easy to weld a new film to the partition wall PT401 defining the atmosphere opening port 401 as compared with the aspect in which the dimension H401 of the partition wall PT401 and the dimension H403 of the partition wall PT403 are equal to each other. Therefore, after the sealing film FLe is peeled off from the partition wall PT401, a new film is welded to the partition wall PT401 defining the atmosphere opening port 401, so that the atmosphere introduction path 400 defined by the partition wall PT401 defining the atmosphere opening port 401 can be sealed again with a new film. Then, by setting the dimension H401 of the partition wall PT401 to a sufficient size, such processing can be performed a plurality of times.

The atmosphere introduction path 400 is provided in the casing 900 (refer to an upper portion in FIG. 3). The atmosphere introduction path 400 couples the atmosphere opening port 401 to the liquid storage chambers 117 and 121. Specifically, the atmosphere introduction path 400 introduces air via the atmosphere opening port 401, allows the air to flow through flow holes 402, 405, 406, 407, 415, and 416, and supplies the air to the liquid storage chamber 117 (refer to FIG. 3 and FIG. 6). In FIGS. 3 and 6, the recess portion constituting the atmosphere introduction path 400 is illustrated as a recess portion R400.

The atmosphere introduction path 400 includes the bent flow path portion 403, the barrier flow path portion 4H, the air chambers 408 and 409, the capturing portion 4C, and the air chamber 414 in that order in the direction from the atmosphere opening port 401 toward the liquid storage chamber 117 (refer to FIGS. 3 and 6).

The capturing portion 4C constitutes a portion of the atmosphere introduction path 400 (refer to a lower right portion in FIG. 3, a lower left portion in FIG. 6, and a lower right portion in FIG. 7). The capturing portion 4C has a function of capturing the ink entering into the atmosphere introduction path 400. The configuration of the capturing portion 4C will be described later in detail.

The atmosphere introduction path 400 is closed by the ventilation film FLv at a portion on the side of the atmosphere opening port 401 as compared with the capturing portion 4C (refer to an upper center portion in FIG. 3). The ventilation film FLv surrounds the flow hole 405, is welded to an upper end of a wall having a lower height than a surrounding wall portion, and partitions a space surrounded by the wall having a lower height from a space surrounding the wall having a lower height. The ventilation film FLv is made of a material that allows air to flow and does not allow the ink stored in the liquid storage chambers 117 and 121 to flow. Specifically, the ventilation film FLv is composed by a film having fine holes of a size that allows gaseous oxygen or nitrogen molecules to flow and do not allow liquid molecules to flow.

With such an aspect, the ink, which flows out from the capturing portion 4C to a portion on the side of the atmosphere opening port 401 in the atmosphere introduction path 400, can also be prevented from flowing out to the outside through the atmosphere opening port 401.

A barrier flow path portion 4H is positioned in the atmosphere introduction path 400 at a portion between the capturing portion 4C and the ventilation film FLv. The barrier flow path portion 4H is positioned vertically above the capturing portion 4C in the posture of the liquid storage container IC when ink is supplied to the outside from the liquid supply port 200 of the liquid storage container IC. Specifically, the barrier flow path portion 4H is a flow path portion 4H1 between the flow hole 405 and the flow hole 406 and a flow path portion 4H2 between the flow hole 406 and the flow hole 407 (refer to an upper left portion in FIG. 6, an upper right portion of FIG. 3, and an upper right portion of FIG. 7).

With such an aspect, although ink that has passed through the capturing portion 4C is present, the ink rises against the gravity and does not reach the ventilation film FLv unless the ink gets over the barrier flow path portion 4H positioned vertically above. Therefore, the possibility that the ink that has passed through the capturing portion 4C comes into contact with the ventilation film FLv can be reduced. As a result, the possibility that the entire ventilation film FLv is wetted with the ink and thus, air cannot flow in the atmosphere introduction path 400 can be reduced.

The bent flow path portion 403 is positioned between the capturing portion 4C and the ventilation film FLv in the atmosphere introduction path 400 (refer to an upper left portion in FIG. 3 and an upper left portion in FIG. 7). The bent flow path portion 403 includes a pair of flow path portions 403*a* and 403*b* that are coupled to each other and allow air to flow in the opposite direction (refer to a lower left portion in FIG. 3 and a lower left portion in FIG. 7). The cross-sectional area of the flow path portions 403*a* and 403*b* is smaller than the cross-sectional area of the flow hole 402 of the atmosphere introduction path 400 coupled to the flow path portions 403*a* and 403*b*. In the present embodiment, the bent flow path portion 403 includes three such pairs of flow path portions. In FIGS. 3 and 7, the recess portion constituting the bent flow path portion 403 is illustrated as a recess portion R403. The recess portion R403 constitutes a portion of the atmosphere introduction path 400. The recess portion R403 is defined by the partition wall PT403 (refer to an upper portion in FIG. 7). The atmosphere introduction path 400 does not include such the bent flow path portion 403 between the capturing portion 4C and the liquid storage chambers 117 and 121.

With such a configuration, the amount of the volatile component of the ink in the liquid storage chambers 117 and 121 that evaporates via the atmosphere introduction path 400 can be reduced.

The air chambers 408, 409, and 414 are chambers for retaining air in the middle of the atmosphere introduction path 400 (refer to an upper left portion and a lower left portion in FIG. 6).

Figure 11:
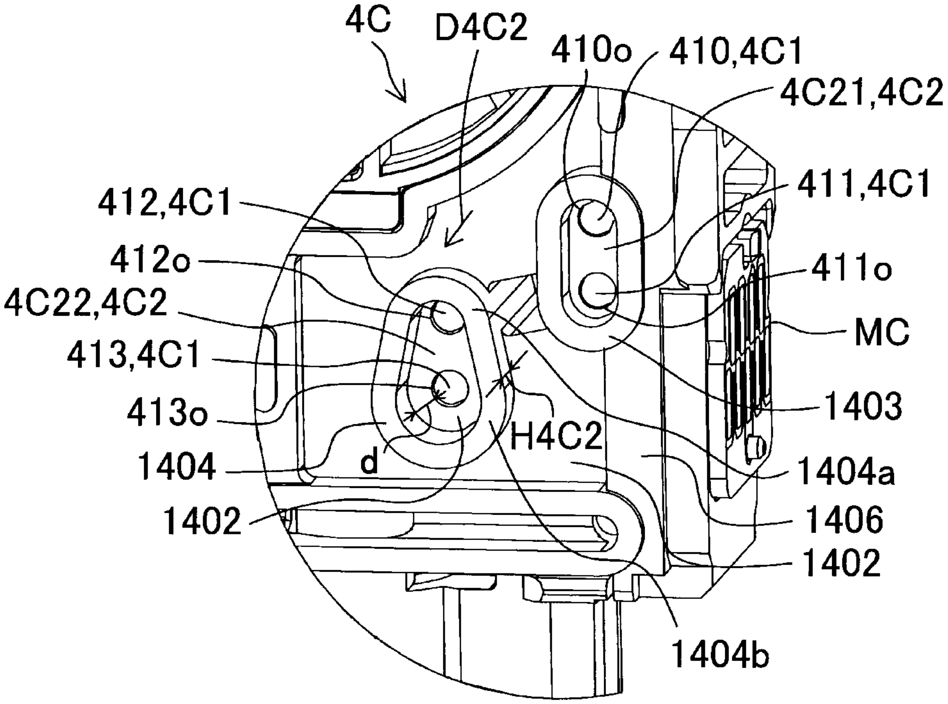
FIG. 11 is an enlarged view illustrating an enlarged portion in the vicinity of a capturing portion illustrated in FIGS. 3 and 7.

FIG. 11 is an enlarged view illustrating an enlarged portion in the vicinity of the capturing portion 4C illustrated in FIGS. 3 and 7. The capturing portion 4C constitutes a portion of the atmosphere introduction path 400. The capturing portion 4C includes a first area 4C1, a second area 4C2, and a third area 4C3.

Specifically, the first area 4C1 is four cylindrical spaces 410, 411, 412, and 413. The cylindrical spaces 410, 411, 412, and 413 extend in directions parallel to each other. The cylindrical spaces 410, 411, 412, and 413 extend in a direction that coincides with a horizontal direction in a posture when the liquid storage container IC is mounted in the printer and used. The cylindrical spaces 410, 411, 412, and 413 are also referred to as the “first area”. The air introduced from the atmosphere opening port 401 flows through the first areas 410, 411, 412, and 413 in that order in the capturing portion 4C.

The second area 4C2 is provided on the side of the casing 900 facing the first partition wall film FLp1 (refer to a lower right portion in FIGS. 2 and 3). The second area 4C2 is flow path portions 4C21 and 4C22 extending in a direction different from that of the first area 4C1. More specifically, the flow path portions 4C21 and 4C22 extend in a direction perpendicular to the direction in which the first areas 410, 411, 412, and 413 extend. The flow path portions 4C21 and 4C22 extend in a direction that coincides with the vertical direction in a posture when the liquid storage container IC is mounted in the printer and used. The flow path portions 4C21 and 4C22 are also referred to as the “second area”.

The second area 4C21 is coupled to the first area 410 via a circular opening 4100 having a circular outer shape and provided in a wall portion 1402 constituting a portion of the liquid storage container IC (refer to an upper right portion in FIG. 11). The second area 4C21 is coupled to the first area 411 via a circular opening 4110 provided in the wall portion 1402 and having a circular outer shape.

The second area 4C21 is defined by the wall portion 1402, a peripheral wall 1403, and the partition wall film FLp (refer to an upper right portion in FIG. 11). The wall portion 1402 is a wall portion provided with the circular opening 4100 among the components of the casing 900. The peripheral wall 1403 is a wall portion protruding from the wall portion 1402. The peripheral wall 1403 surrounds the circular opening 410*o*. The partition wall film FLp is bonded to the upper end of the peripheral wall 1403. The partition wall film FLp separates a space surrounded by the peripheral wall 1403 from the outside of the liquid storage container IC (refer to a lower left portion in FIG. 2). In addition, in order to facilitate understanding of the technique, the partition wall film FLp is not illustrated in FIG. 11.

The second area 4C22 is coupled to the first area 412 via a circular opening 4120 provided in the wall portion 1402 and having a circular outer shape (refer to a middle left portion in FIG. 11). The second area 4C22 is coupled to the first area 413 via a circular opening 4130 having a circular outer shape and provided in the wall portion 1402 constituting a portion of the liquid storage container IC. Since the second area 4C22 has such a configuration, ink can be exchanged between the circular opening 4130 and the second area 4C2 regardless of the orientation of the liquid storage container IC.

The second area 4C22 is defined by the wall portion 1402, a peripheral wall 1404, and the partition wall film FLp (refer to a middle left portion in FIG. 11). The wall portion 1402 is a wall portion provided with the circular opening 4120 among the components of the casing 900.

The peripheral wall 1404 is a wall portion protruding from the wall portion 1402. The peripheral wall 1404 surrounds the circular opening 4120. The peripheral wall 1404 defines a portion of a recess portion R4C2 constituting the second area 4C2 of the capturing portion 4C. The first partition wall film FLp1 is welded to the peripheral wall 1404 (refer to a center portion in FIG. 2). In FIG. 11, a dimension of a portion of the peripheral wall 1404, which protrudes in a direction D4C2 from the wall portion 1402 coupled to the outer periphery of the peripheral wall 1404 toward the first partition wall film FLp1, is illustrated as a dimension H4C2. The dimension H4C2 of the peripheral wall 1404 is larger than the dimension H403 of the partition wall PT403 defining the bent flow path portion 403 (refer to an upper center portion in FIG. 10 and a center portion in FIG. 11).

With such a configuration, it is easy to weld a new film to the peripheral wall 1404 as compared with an aspect in which the dimension H4C2 of the peripheral wall 1404 and the dimension H403 of the partition wall PT403 are equal to each other. Therefore, after providing a hole in the first partition wall film FLp1, the new film FLp2 is welded to the peripheral wall 1404, so that the flow path portion 4C22 defined by the peripheral wall 1404 can be composed again by the new film FLp2. Then, by setting the dimension H4C2 of the peripheral wall 1404 to a sufficient size, such processing can be performed a plurality of times.

The peripheral wall 1404 includes a first partial wall 1404*a* and a second partial wall 1404*b*. The first partial wall 1404*a* is a partial wall that surrounds the circular opening 4120. The cylindrical space 412 is coupled to the second area 4C22 via the circular opening 4120. The cylindrical space 412 is positioned closer to the side of the atmosphere opening port 401 than the second area 4C22 in the atmosphere introduction path 400. The second partial wall 1404*b* is a partial wall that surrounds the circular opening 4130. The cylindrical space 413 is coupled to the second area 4C22 via the circular opening 4130. The cylindrical space 413 is positioned closer to the side of the liquid storage chambers 117 and 121 than the second area 4C22 in the atmosphere introduction path 400.

In the second area 4C22, the space surrounded by the second partial wall 1404*b* is larger than the space surrounded by the first partial wall 1404*a*. In addition, the "size of the space surrounded by the first partial wall 1404*a*" is defined by the diameter of the maximum virtual circle that can be stored within the area surrounded by the first partial wall 1404*a* when viewed from a direction perpendicular to the opening surface of the circular opening 4120. The "size of the space surrounded by the second partial wall 1404*b*" is defined by the diameter of the maximum virtual circle that can be stored in the area surrounded by the second partial wall 1404*b* when viewed from a direction perpendicular to the opening surface of the circular opening 4130. The dimensions related to the space surrounded by the second partial wall 1404*b* and the space surrounded by the first partial wall 1404*a* will be further described later.

By adopting such an aspect, in the second area 4C22, it is easier to collect ink in the space surrounded by the second partial wall 1404*b* at a position close to the liquid storage chambers 117 and 121 than the space surrounded by the first partial wall 1404*a*. In other words, more ink can be captured in the space surrounded by the second partial wall 1404*b*. Therefore, it is easier to guide the ink to the second area 4C2 as compared with an aspect in which the space surrounded by the second partial wall 1404*b* is smaller than the space surrounded by the first partial wall 1404*a*. In other words, it is more difficult for the ink to reach the atmosphere opening port 401.

The partition wall film FLp is bonded to the upper end of the peripheral wall 1404. The partition wall film FLp separates the space surrounded by the peripheral wall 1404 from the outside of the liquid storage container IC (refer to a lower left portion in FIG. 2). In addition, in order to facilitate understanding of the technique, the partition wall film FLp is not illustrated in FIG. 11.

The third area 4C3 is provided on the side facing the inner film FLi in the casing 900 (refer to a lower left portion in FIG. 6). The third area 4C3 is a flow path portion extending in a direction different from that of the first area 4C1 and the second area 4C2. More specifically, the third area 4C3 extends in a direction perpendicular to the direction in which the first areas 410, 411, 412, and 413 extend, and in a direction at a twisted position in a direction in which the second areas 4C21 and 4C22 extend.

The third area 4C3 is coupled to the first area 411 via a circular opening having a circular outer shape (refer to a lower left portion in FIG. 6). The third area 4C3 is coupled to the first area 412 via a circular opening having a circular outer shape.

As a result, the air introduced from the atmosphere opening port 401 flows through the first area 410, the second area 4C21, the first area 411, the third area 4C3, the first area 412, the second area 4C22, and the first area 413 in that order in the capturing portion 4C.

With such a configuration, although the liquid storage container IC is disposed in various orientations, ink can be captured by the first area 4C1, the second area 4C2, and the third area 4C3 that are included in the capturing portion 4C constituting a portion of the atmosphere introduction path 400 and extend in directions different from each other. As a result, the possibility that the ink in the liquid storage chambers 117 and 121 flows out to the outside through the atmosphere opening port 401 can be reduced.

The casing 900 includes another wall portion 1406 protruding from the wall portion 1402 in the same direction as the peripheral wall 1404 and adjacent to the peripheral wall 1404. The fact that the two wall portions are "adjacent" means that there is no other wall portion between the two wall portions that protrudes in the same direction as the two wall portions. The height H4C2 of the peripheral wall 1404 is higher than the height of the wall portion 1406.

Since the liquid storage container IC of the present embodiment has the above-described configuration, as will be described later, ink can be easily stored in the used liquid storage container IC. That is, the partition wall film FLp can be provided with a through hole FLpO, a pouring nozzle 830 having a conical portion **830*t* can be inserted into the capturing portion 4C through the through hole FLpO, and the truncated conical portion 830*t* can be inserted into the circular opening 4130. Then, the circular opening 4130 can be sealed by the pouring nozzle 830. Ink in the liquid storage chamber IC can be sucked through the liquid supply port 200. As a result, the ink can be delivered from the pouring nozzle 830 of a filling device 800, and the ink can be allowed to flow into the liquid storage chambers 117 and 121 via the circular opening 4130. That is, by decreasing the pressure in the liquid storage chambers 117 and 121, the ink can be allowed to flow into the liquid storage chambers 117 and 121 via the circular opening 4130**. Hereinafter, the configuration and processing for this will be described in detail.

A2. Refilling of Liquid Storage Container with Ink

Figure 12:
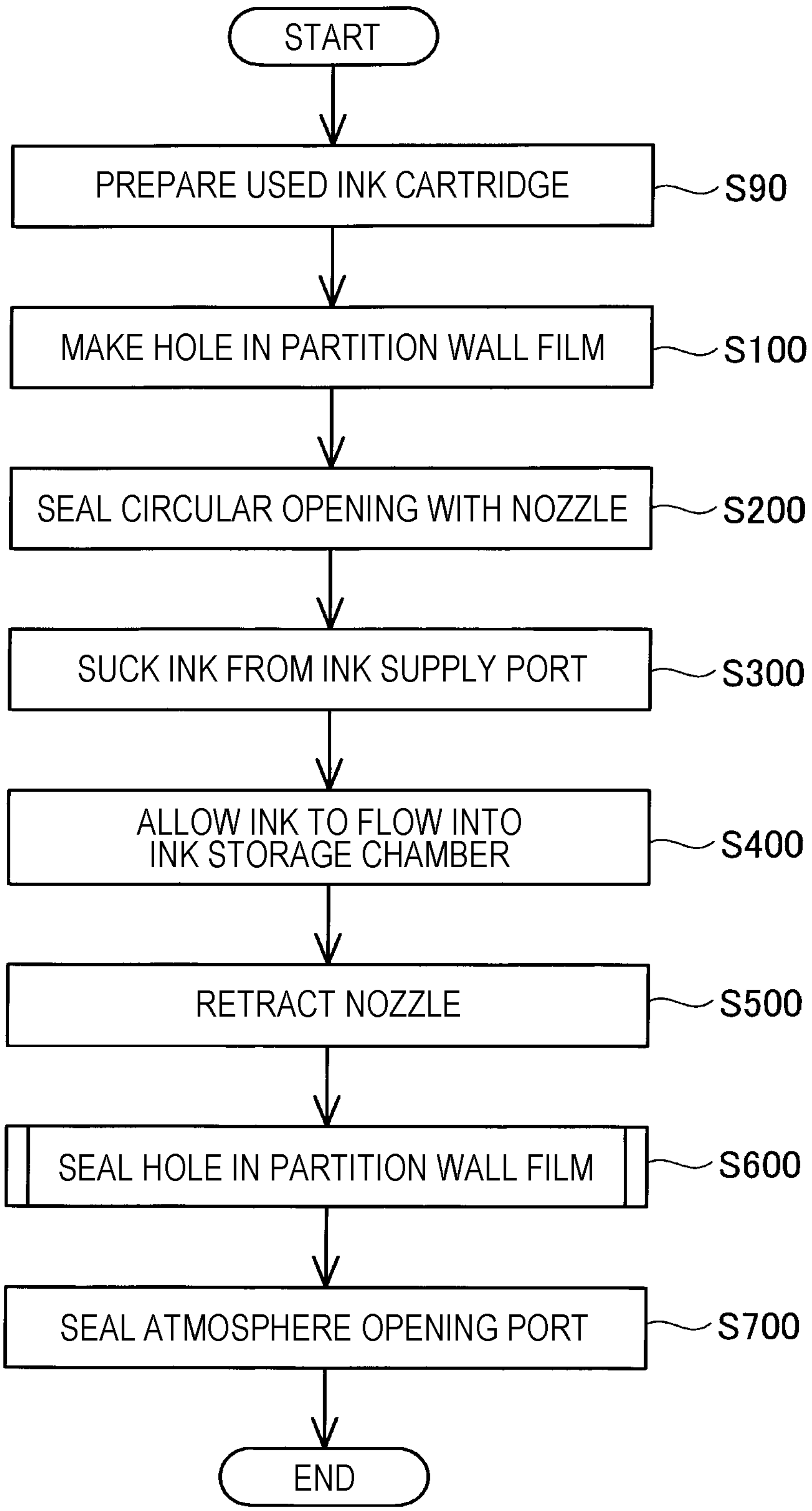
FIG. 12 is a flowchart illustrating processing of refilling a liquid storage container with ink.

FIG. 12 is a flowchart illustrating processing of refilling the liquid storage container with the ink. As a result of the processing of FIG. 12, the ink is stored in the used liquid storage container, and a new liquid storage container is manufactured.

In a step S90 in FIG. 12, an operator prepares the liquid storage container IC. The liquid storage container IC prepared in the step S90 is the used liquid storage container IC. At least a portion of the ink in the liquid storage chambers 117 and 121 of the liquid storage container IC prepared in the step S90 is consumed.

Figure 13:
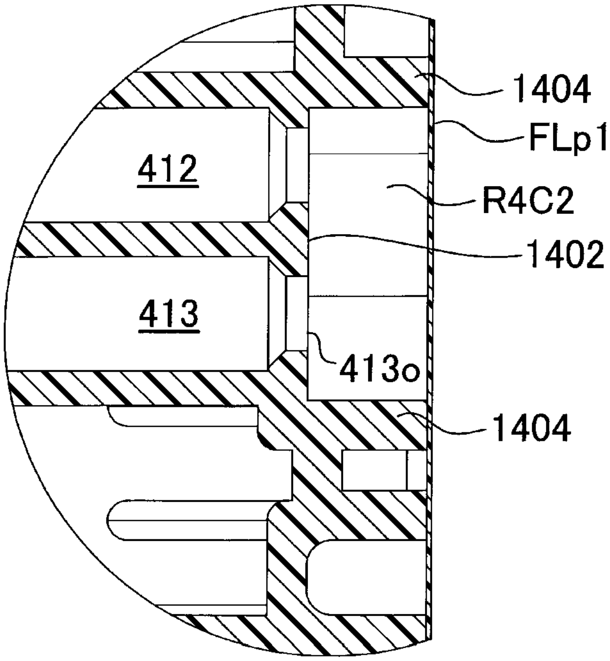
FIG. 13 is a partial cross-sectional view illustrating a structure in the vicinity of cylindrical spaces of the capturing portion.

FIG. 13 is a partial cross-sectional view illustrating a structure in the vicinity of the cylindrical spaces 412 and 413 of the capturing portion 4C. In FIG. 13, a recess portion constituting the second area 4C2 of the capturing portion 4C is illustrated as the recess portion R4C2. The recess portion R4C2 constitutes a portion of the atmosphere introduction path 400.

In a step S100 in FIG. 12, the operator provides the through hole FLpO in the partition wall film FLp. Specifically, the through hole FLpO is opened in the first partition wall film FLp1 as the partition wall film FLp (refer to FIG. 13).

Figure 14:
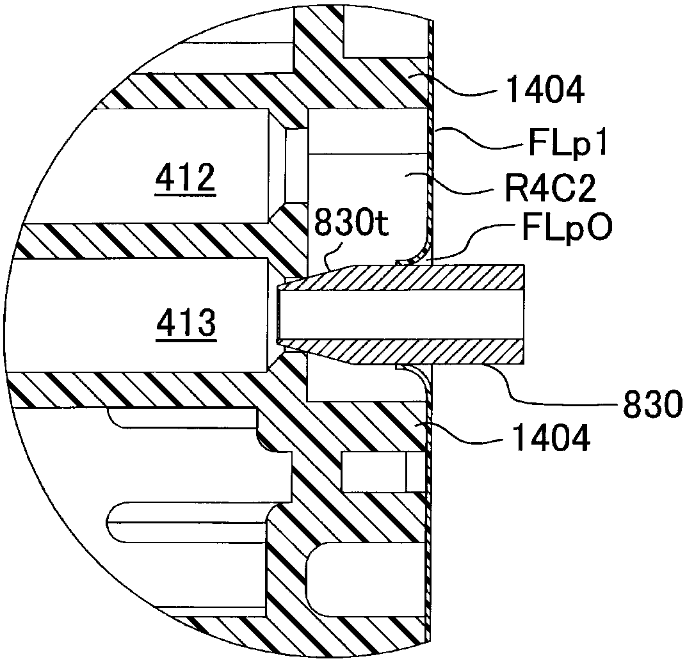
FIG. 14 is a partial cross-sectional view illustrating a structure in the vicinity of spaces after a step S200 in FIG. 12.

FIG. 14 is a partial cross-sectional view illustrating a structure in the vicinity of the spaces 412 and 413 after a step S200 in FIG. 12. In the step S200, the operator inserts the pouring nozzle 830 having the truncated conical portion **830*t* into the capturing portion 4C through the through hole FLpO (refer to a lower right portion in FIG. 7). Then, the operator seals the outer periphery of the circular opening 4130 with an outer surface that constitutes the taper of the truncated conical portion 830*t* of the pouring nozzle 830 by inserting the truncated conical portion 830*t* into the circular opening 4130**.

In the wall portion 1402 of the liquid storage container IC, a distance between the outer periphery of the circular opening 4130 and the base portion of the peripheral wall 1404 is larger than a distance between the outer periphery of the circular opening 4120 and the base portion of the peripheral wall 1404 (refer to FIG. 11). More specifically, a distance d between the outer periphery of the circular opening 4130 and the base portion of the peripheral wall 1404 is 0.6 mm. Therefore, the pouring nozzle 830 can enter the peripheral wall 1404, and the truncated conical portion **830*t* can be easily inserted into the circular opening 4130**.

In a step S300 in FIG. 12, the operator couples a suction device 700 to the liquid supply port 200 of the liquid storage container IC (refer to a lower right portion in FIG. 7). Thereafter, the operator drives the suction device 700 coupled to the liquid supply port 200 to suck the ink in the liquid storage chambers 117 and 121 through the liquid supply port 200.

In a step S400 in FIG. 12, the ink is delivered from the pouring nozzle 830, and the ink flows into the liquid storage chambers 117 and 121 via the circular opening 4130 of the liquid storage container IC and the atmosphere introduction path 400 (refer to FIGS. 7 and 6).

The atmosphere introduction path 400 of the liquid storage container IC does not have a configuration such as the bent flow path portion 403 between the capturing portion 4C and the liquid storage chambers 117 and 121 (refer to FIGS. 3, 6, and 7). Therefore, the ink can be efficiently poured from the capturing portion 4C into the liquid storage chambers 117 and 121.

Figure 15:
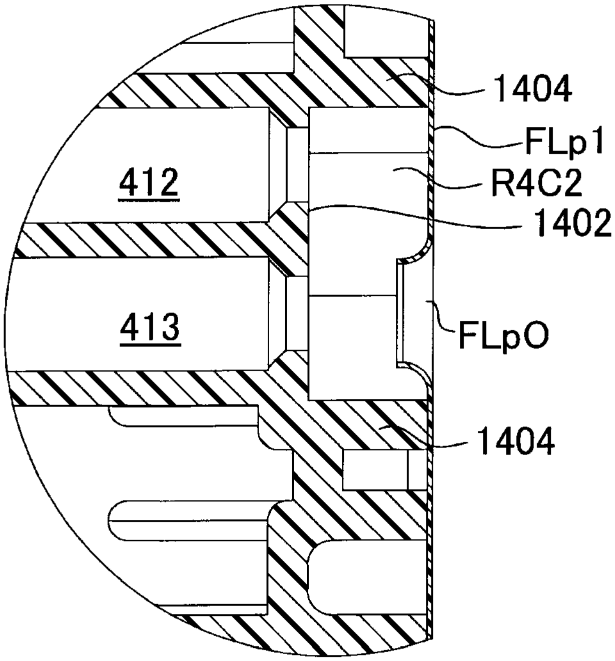
FIG. 15 is a partial cross-sectional view illustrating a structure in the vicinity of the spaces after a step S500.

FIG. 15 is a partial cross-sectional view illustrating a structure in the vicinity of the spaces 412 and 413 after a step S500. In the step S500 in FIG. 12, the operator retracts the pouring nozzle 830 to the outside of the capturing portion 4C.

In the present embodiment, the recess portion R4C2 constituting the second area 4C2 of the capturing portion 4C is positioned between the recess portion R403 constituting the bent flow path portion 403 and the liquid storage chambers 117 and 121, in the atmosphere introduction path 400.

With such a configuration, as compared with the aspect in which the recess portion R4C2 of the capturing portion 4C is on the side opposite to the liquid storage chambers 117 and 121 with respect to the recess portion R403 of the bent flow path portion 403 in the atmosphere introduction path 400, by providing a hole in the first partition wall film FLp1, the liquid storage chambers 117 and 121 can be easily filled with ink through the recess portion R4C2 of the capturing portion 4C.

Figure 16:
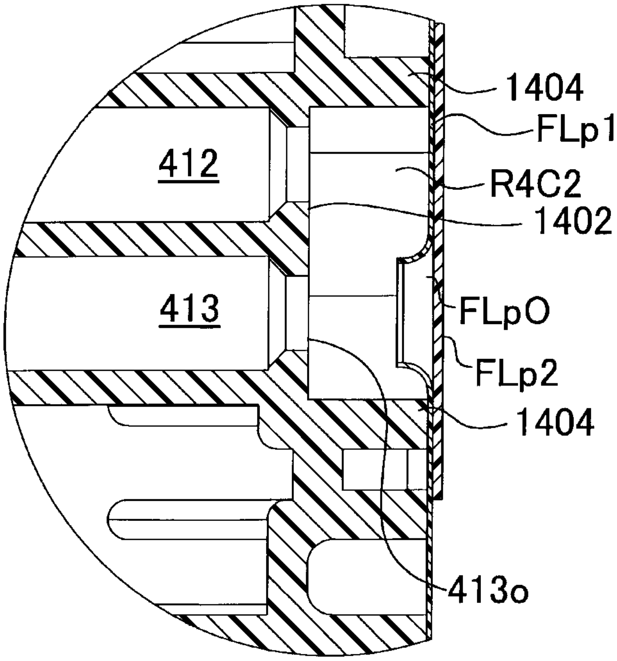
FIG. 16 is a partial cross-sectional view illustrating a structure in the vicinity of the spaces after a step S600.

FIG. 16 is a partial cross-sectional view illustrating a structure in the vicinity of the spaces 412 and 413 after the step S600. In the step S600 in FIG. 12, the operator seals the through hole FLpO provided in the first partition wall film FLp1 as the partition wall film FLp. More specifically, the through hole FLpO is sealed by the second partition wall film FLp2. In this state, the partition wall film FLp is composed by the first partition wall film FLp1 and the second partition wall film FLp2 (refer to a lower left portion in FIG. 2 and a lower right portion in FIG. 1).

By performing the above processing, even in the liquid storage container IC provided with the differential pressure valve 325, the pressure in the liquid storage chambers 117 and 121 is decreased, so that the ink can flow into the liquid storage chambers 117 and 121 via the circular opening 4130. That is, the ink can be easily stored in the used liquid storage container IC.

In the present embodiment, the circular opening 413*o* is positioned at a position facing the resin partition wall film FLp with the second area 4C22, which is a space, interposed therebetween. Therefore, by making the through hole FLpO in the partition wall film FLp, the pouring nozzle 830 can be easily coupled to the circular opening 4130 to pour the ink.

In the present embodiment, the dimension H4C2 of the peripheral wall 1404 is larger than the dimension H403 of the partition wall PT403 defining the bent flow path portion 403 (refer to an upper center portion in FIG. 10). Therefore, the through hole FLpO is provided in the first partition wall film FLp1 welded to the peripheral wall 1404 surrounding the circular opening 4130, and after the ink is filled through the circular opening 4130, the new film FLp2 is welded to the peripheral wall 1404, so that the second area 4C2 can be composed again by the new second partition wall film FLp2. Then, by setting the dimension H4C2 of the peripheral wall 1404 to a sufficient size, a new film is welded to the same liquid storage container IC, so that the processing of constituting the second area 4C2 again can be performed a plurality of times.

In a step S700 in FIG. 12, the operator seals the atmosphere opening port 401 of the liquid storage container IC by the sealing film FLe that does not allow ink stored in the liquid storage chambers 117 and 121 to flow (refer to an upper left portion in FIG. 1). The sealing film FLe is a film that can be peeled off from the casing 900 of the liquid storage container IC.

By performing this processing, in a state after ink is filled and before the use of the liquid storage container IC after refilling is started, the ink, which flows out from the capturing portion 4C to a portion on the side of the atmosphere opening port 401 in the atmosphere introduction path 400, can also be prevented from flowing out to the outside through the atmosphere opening port 401.

Figure 17:
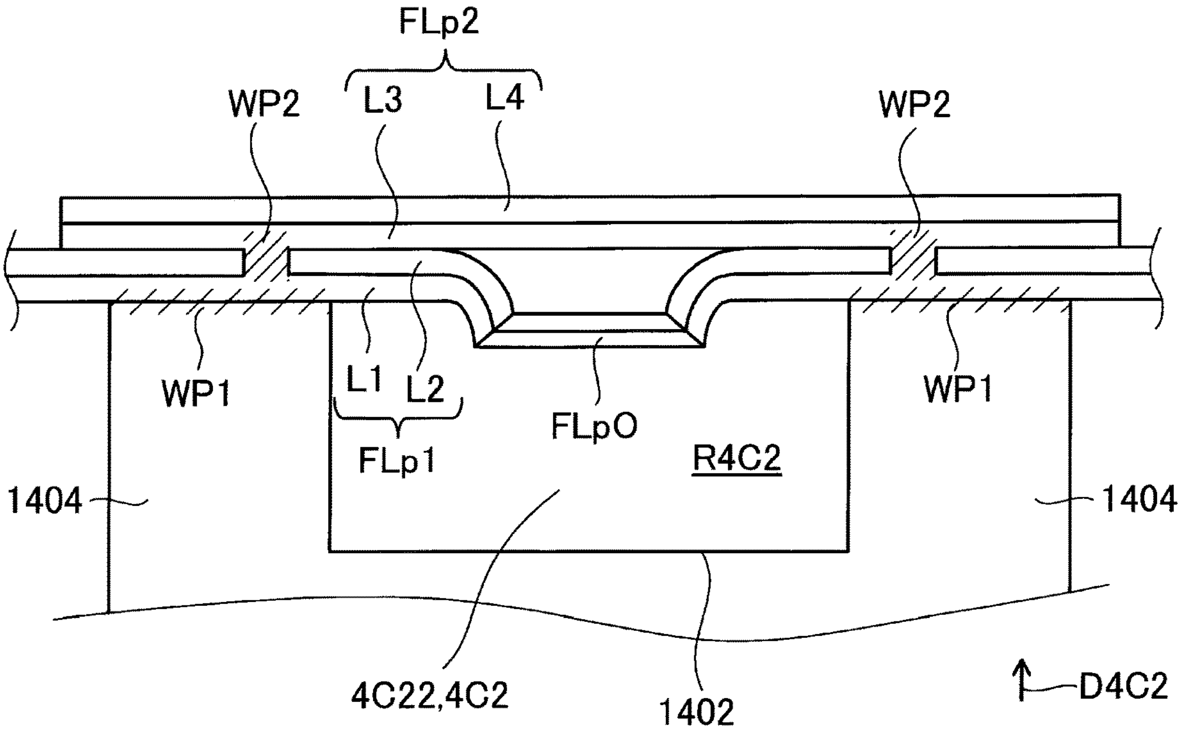
FIG. 17 is an explanatory view illustrating a state in the vicinity of a through hole of the partition wall film after processing of the step S600 in FIG. 12.

FIG. 17 is an explanatory view illustrating a state in the vicinity of the through hole FLpO of the partition wall film FLp after processing of the step S600 in FIG. 12. The first partition wall film FLp1 that functions as the partition wall film FLp in a state before the through hole FLpO is made includes a first layer L1 and a second layer L2. The first layer L1 is a layer welded to the partition wall of the casing 900. The first layer L1 is made of the same resin as the resin constituting the partition wall PT403 defining the bent flow path portion 403. More specifically, the first layer L1 is made of polypropylene. The second layer L2 is a layer exposed to the outside of the liquid storage container IC. The second layer L2 is made of a material having a higher melting point than the material of the first layer L1. More specifically, the second layer L2 is made of polyethylene terephthalate.

The first layer L1 is bonded to an upper end of the peripheral wall 1404 surrounding the second area 4C22 of the capturing portion 4C (refer to a middle left portion in FIG. 11). More specifically, the first layer L1 is welded to the upper end of the peripheral wall 1404. The "upper end" of the peripheral wall 1404 means the tip end in the direction D4C2 in which the peripheral wall 1404 protrudes from the wall portion 1402. The welding portion between the first layer L1 and the peripheral wall 1404 is illustrated by hatching as a welding portion WP1 in FIG. 17.

The second partition wall film FLp2 is bonded to the first partition wall film FLp1 to close the through hole FLpO of the first partition wall film FLp1. The second partition wall film FLp2 includes a third layer L3 and a fourth layer L4. The third layer L3 is made of a material having a lower melting point than the material of the second layer L2. The fourth layer L4 is made of a material having a higher melting point than the material of the third layer L3. More specifically, the third layer L3 is made of a polyolefin-based synthetic resin. The fourth layer L4 is made of a polyethylene terephthalate-based synthetic resin.

Figure 18:
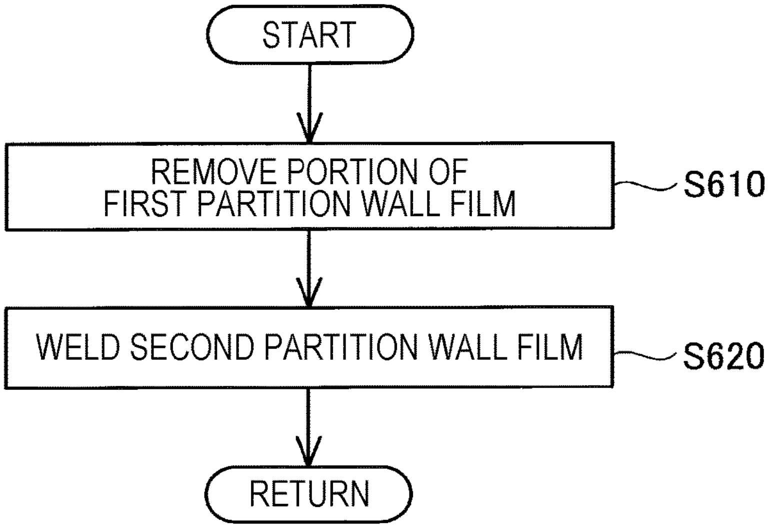
FIG. 18 is a flowchart illustrating processing in the step S600 in FIG. 12.

FIG. 18 is a flowchart illustrating processing in the step S600 of FIG. 12. In the step S600 in FIG. 12, the through hole FLpO included in the partition wall film FLp is sealed by the second partition wall film FLp2.

In a step S610, the operator removes a portion of the second layer L2 of the first partition wall film FLp1 until the first layer L1 is exposed. More specifically, a portion that is a portion of the first partition wall film FLp1 and is positioned in an annular area surrounding the through hole FLpO is removed.

In a step S620, the operator disposes the second partition wall film FLp2 such that the third layer L3 of the second partition wall film FLp2 faces the first partition wall film FLp1. Then, the operator welds the third layer L3 of the second partition wall film FLp2 to the first layer L1 of the first partition wall film FLp1. More specifically, in a portion of the first partition wall film FLp1 in which the first layer L1 is exposed, the third layer L3 of the second partition wall film FLp2 is welded to the first layer L1 of the partition wall film FLp. The welding portions of the third layer L3 of the second partition wall film FLp2 and the first layer L1 of the partition wall film FLp are illustrated by hatching as a welding portion WP2 in FIG. 17.

By performing such processing, in the liquid storage container IC after refilling with the ink, the strength of the partition wall film FLp can be ensured by the second layer L2 of the first partition wall film FLp1 having a high melting point and the fourth layer L4 of the second partition wall film FLp2 having a high melting point. On the other hand, in an area surrounding the through hole FLpO, since the third layer L3 of the second partition wall film FLp2 is welded to the first layer L1 of the first partition wall film FLp1, the bonding between the second partition wall film FLp2 and the first partition wall film FLp1 can be strengthened. In addition, the ink can be prevented from leaking to the outside from the second area 4C22 via the through hole FLpO.

When the third layer L3 of the second partition wall film FLp2 is welded to the first layer L1 of the partition wall film FLp, a portion of the peripheral wall 1404 is melted by heat and flows downward. However, the height of the peripheral wall 1404 is higher than the height of the other wall portion 1406 protruding from the wall portion 1402 and adjacent to the peripheral wall 1404. Therefore, the flowing material is less likely to close the circular opening 4130. In addition, a distance between the outer periphery of the circular opening 4130 and the base portion of the peripheral wall 1404 is larger than a distance between the outer periphery of the circular opening 4120 and the base portion of the peripheral wall 1404 (refer to FIG. 11). Therefore, also from this point, it is less likely that the flowing material closes the circular opening 4130.

After the processing of FIGS. 12 and 18, the liquid storage container IC is in the state illustrated in FIG. 1. In the liquid storage container IC illustrated in FIG. 1, the partition wall film FLp includes the first partition wall film FLp1 and the second partition wall film FLp2. The first partition wall film FLp1 is bonded to the upper end of the peripheral wall 1404, separates a space surrounded by the peripheral wall 1404 from the outside of the liquid storage container IC, and has the through hole FLpO. The second partition wall film FLp2 is disposed on the side opposite to the peripheral wall 1404 with respect to the first partition wall film FLp1, and is welded to the peripheral wall 1404 (refer to FIG. 17).

By such a processing, after a hole is provided in the first partition wall film FLp1 that has already been welded, the new second partition wall film FLp2 is welded to the peripheral wall 1404, and the second area 4C2 defined by the peripheral wall 1404 can be composed again by the new second partition wall film FLp2. As a result, the liquid storage container IC can be recycled.

By performing the processing described above, the liquid storage container IC is recycled.

A3. Modification of Partition Wall Due to Refilling of Ink

In the following, the welding of the first partition wall film FLp1 to the partition wall PT403 defining the bent flow path portion 403 and the welding of the sealing film FLe to the partition wall PT401 defining the atmosphere opening port 401 will be compared and described (refer to a middle left portion and a lower left portion in FIG. 2).

Figure 19:
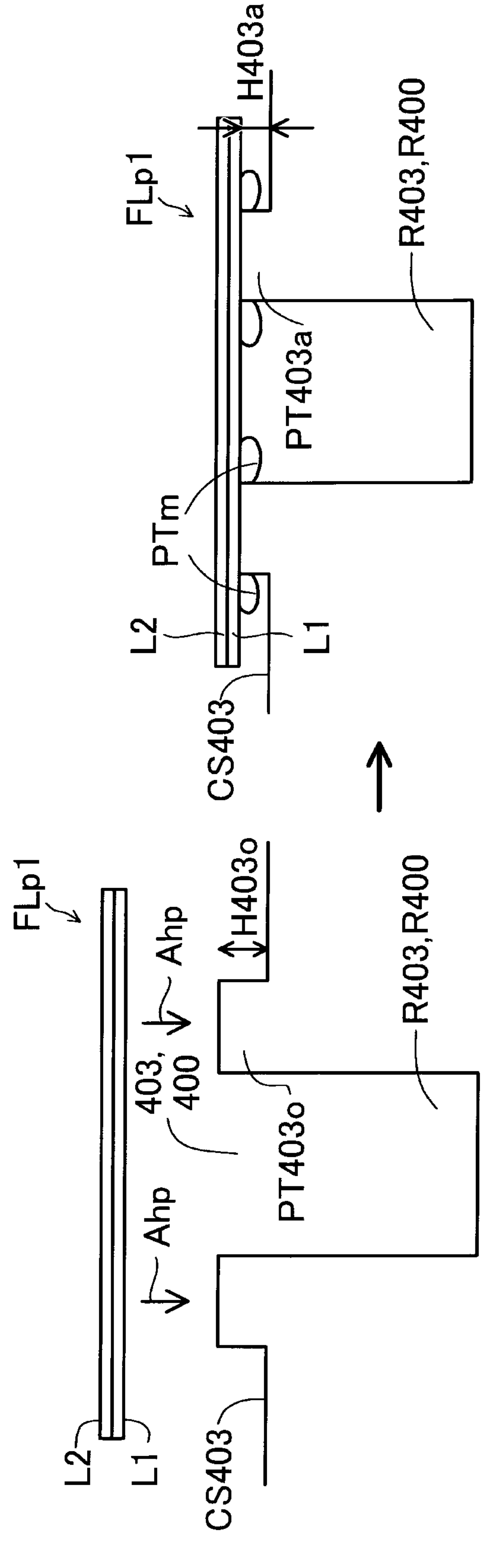
FIG. 19 is a view illustrating welding processing of a first partition wall film to a partition wall that defines a bent flow path portion.

FIG. 19 is a view illustrating processing of welding the first partition wall film FLp1 to the partition wall PT403 that defines the bent flow path portion 403. As described above, the first partition wall film FLp1 includes the first layer L1 and the second layer L2. The first layer L1 is made of the same resin as the resin constituting the partition wall PT403 defining the bent flow path portion 403. Therefore, as compared with the aspect in which the first layer L1 of the first partition wall film FLp1 is made of a material different from the resin constituting the partition wall PT403 defining the bent flow path portion 403, the first partition wall film FLp1 is firmly welded to the partition wall PT403.

In the processing illustrated in FIG. 19, when the liquid storage container IC is manufactured, the first partition wall film FLp1 is welded to the upper end of the partition wall PT403 defining the bent flow path portion 403 (refer to a left portion in FIG. 19 and a lower left portion in FIG. 2). In FIG. 19, the partition wall PT403 before the first partition wall film FLp1 is welded is illustrated as a partition wall PT403*o*. The height of the partition wall PT403*o* in the protrusion direction D403 is illustrated as H403*o* (refer to FIG. 10 as well). The direction in which the first partition wall film FLp1 is pressed and welded is indicated by an arrow Ahp. The atmosphere introduction path 400 includes the bent flow path portion 403. Therefore, in FIG. 19, the bent flow path portion 403 and the atmosphere introduction path 400 are indicated by reference numerals indicating the same portion.

When the first partition wall film FLp1 is pressed and welded to the partition wall PT403*o*, a portion of the upper end portion of the partition wall PT403*o* is melted by heat at the time of welding. A portion of the melted partition wall PT403*o* is mixed with a portion of the first layer L1 of the first partition wall film FLp1 melted in the same manner, and moves from the upper end of the partition wall PT403*o* onto the side wall of the partition wall PT403*o*. Thereafter, the mixture solidifies. The mixture generated in such a way and attached to the side wall of the partition wall PT403 is illustrated as PTm in FIG. 19 (refer to a right portion in FIG. 19).

As a result that a portion of the partition wall PT403*o* melts and moves onto the side wall, the height H403 of the partition wall PT403 in the protrusion direction D403 is lowered. In FIG. 19, the partition wall PT403 after the first partition wall film FLp1 is welded is illustrated as a partition wall PT403*a*. The height of the partition wall PT403*a* in the protrusion direction D403 is illustrated as H403*a*.

Since the first partition wall film FLp1 is welded to the partition wall PT403, the height H403 of the partition wall PT403 in the protrusion direction is lowered. However, by setting the height H403*o* of the partition wall PT403*o* in the protrusion direction to a sufficient size, the first partition wall film FLp1 can be welded to the partition wall PT403 without being inhibited by the configuration CS403 coupled to the partition wall PT403.

Figure 20:
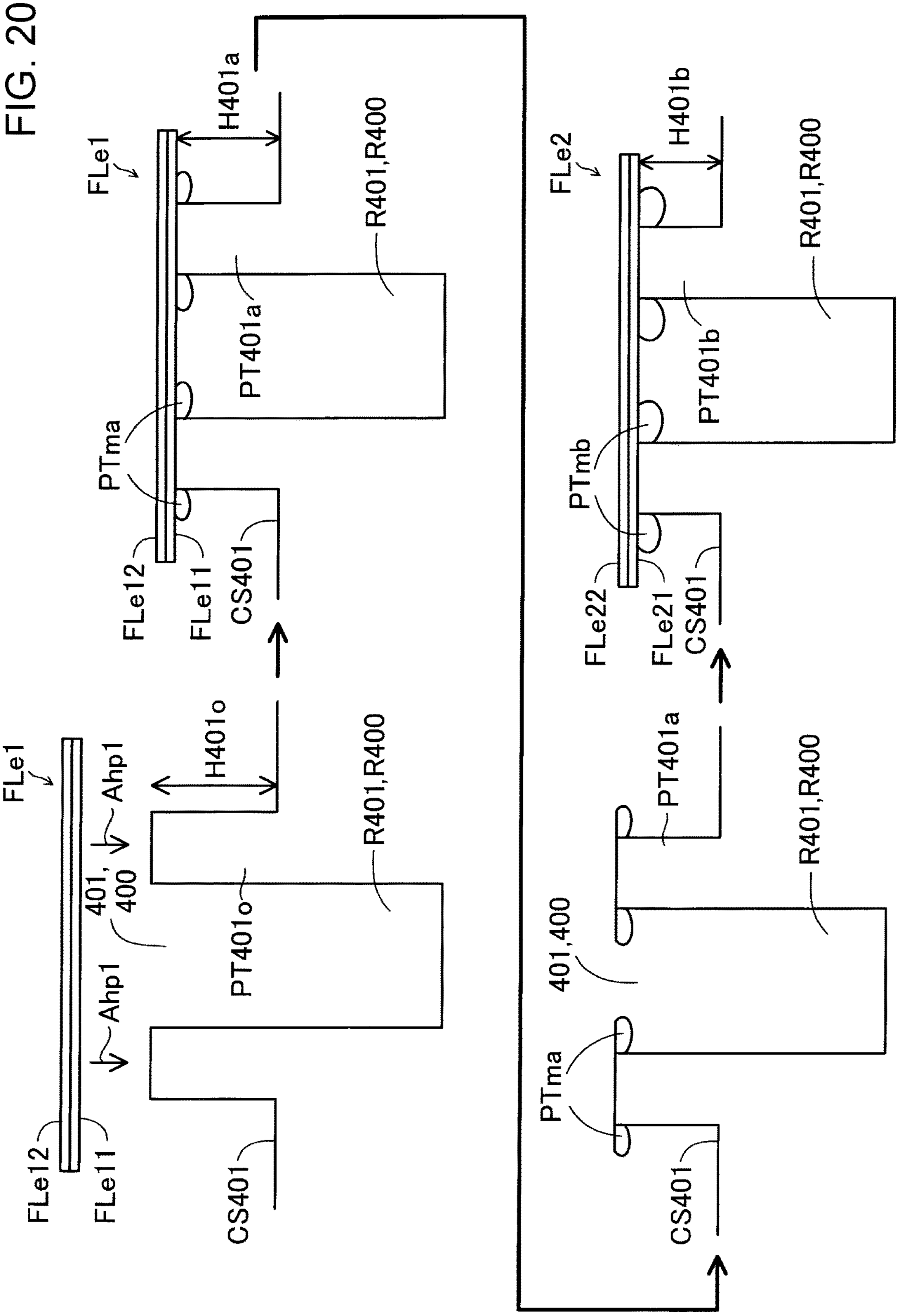
FIG. 20 is a view illustrating welding and re-welding processing of the sealing film to a partition wall that defines the atmosphere opening port.

FIG. 20 is a view illustrating processing of welding and re-welding of the sealing film FLe to the partition wall PT401 that defines the atmosphere opening port 401. In FIG. 20, the sealing film FLe welded to the partition wall PT401 when the liquid storage container IC is newly manufactured is illustrated as the sealing film FLe1 (refer to an upper portion in FIG. 20). The sealing film FLe1 includes a first layer FLe11 and a second layer FLe12.

The first layer FLe11 is a layer welded to the partition wall PT401 that defines the atmosphere opening port 401. The first layer FLe11 is made of materials containing the same component as the resin constituting the partition wall PT401 and a component different from the resin constituting the partition wall PT401 defining the atmosphere opening port 401. More specifically, the first layer FLe11 is made of a material containing polypropylene and a component other than polypropylene. With such a configuration, the sealing film FLe welded to the partition wall PT401 can be easily peeled off from the partition wall PT401 later. That is, an easy peel opening property is realized.

The second layer FLe12 is a layer exposed to the outside of the liquid storage container IC. The second layer FLe12 is made of a material having a higher melting point than the first layer FLe11. More specifically, the second layer L2 is made of a polyethylene terephthalate-based synthetic resin.

In the processing illustrated in FIG. 20, first, when the liquid storage container IC is manufactured, the sealing film FLe1 is welded to the upper end of the partition wall PT401 defining the atmosphere opening port 401 (refer to an upper left portion in FIG. 20 and a middle left portion in FIG. 2). In FIG. 20, the partition wall PT401 before the sealing film FLe1 is welded is illustrated as a partition wall PT401*o*. The height of the partition wall PT401*o* in the protrusion direction D401 is illustrated as H401*o* (refer to FIG. 10 as well). The direction in which the sealing film FLe1 is pressed and welded is indicated by an arrow Ahp1. The atmosphere introduction path 400 couples the atmosphere opening port 401 to the liquid storage chambers 117 and 121. Therefore, in FIG. 20, the atmosphere opening port 401 and the atmosphere introduction path 400 are indicated by reference numerals indicating the same portion.

When the sealing film FLe1 is pressed and welded to the partition wall PT401*o*, a portion of the upper end portion of the melted partition wall PT401*o* is mixed with a portion of the first layer FLe11 of the sealing film FLe1 that is also melted, and moves on the side wall of the partition wall PT401*o*. In this manner, the mixture adhering to the side wall of the partition wall PT401 in FIG. 20 is illustrated as PTma (refer to an upper right portion in FIG. 20).

Due to a result in which a portion of the partition wall PT401*o* melts and moves onto the side wall, the height H401 of the partition wall PT401 in the protrusion direction D401 is lowered. In FIG. 20, the partition wall PT401 after the sealing film FLe1 is welded is illustrated as a partition wall PT401*a*. The height of the partition wall PT401*a* in the protrusion direction D401 is indicated as H401*a*.

The height H401*a* of the partition wall PT401*a* in the protrusion direction is substantially 2.5 times the height H403*o* of the partition wall PT403*a* in the protrusion direction (refer to a right portion in FIG. 19 and an upper right portion in FIG. 20). That is, the height H4010 of the partition wall PT401*o* before the sealing film FLe is welded is set such that the height H401*a* of the partition wall PT401 after the sealing film FLe1 is welded is such a dimension (refer to an upper left portion in FIG. 20).

Thereafter, when the liquid storage container IC is used, the sealing film FLe1 is peeled off (refer to a lower left portion in FIG. 20).

When the used liquid storage container IC is recovered and filled with ink, a sealing film FLe2 is welded to the upper end of the partition wall PT401 again (refer to a lower right portion in FIG. 20). In FIG. 20, the sealing film FLe welded to the partition wall PT401 of the liquid storage container IC refilled with ink is illustrated as the sealing film FLe2. The sealing film FLe2 has the same structure as that of the sealing film FLe1. The sealing film FLe2 includes a first layer FLe21 and a second layer FLe22.

When the sealing film FLe2 is pressed and welded to the partition wall PT401*a*, a portion of the upper end portion of the melted partition wall PT401*a* is mixed with a portion of the first layer FLe21 of the sealing film FLe2 that is also melted, and moves on the side wall of the partition wall PT401*a*. In this manner, the mixture adhering to the side wall of the partition wall PT401 in FIG. 20 is illustrated as PTmb (refer to a lower right portion in FIG. 20).

Due to a result in which a portion of the partition wall PT401*a* melts and moves onto the side wall, the height H401 of the partition wall PT401 in the protrusion direction D401 is further lowered. In FIG. 20, the partition wall PT401 after the sealing film FLe2 is welded is illustrated as a partition wall PT401*b*. The height of the partition wall PT401*b* in the protrusion direction D401 is indicated as H401*b*. In this way, each time the sealing film FLe is welded to the partition wall PT401, the height H401 of the partition wall PT401 in the protrusion direction D401 is lowered.

By performing the processing of FIG. 20, the liquid storage container IC can be flowed in a state in which the atmosphere opening port 401 is closed by the sealing film FLe1 (refer to an upper right portion in FIG. 20). Then, by peeling off the sealing film FLe1 from the partition wall PT401 defining the atmosphere opening port 401, the liquid storage container IC can be used in a state in which the atmosphere can be introduced into the liquid storage chambers 117 and 121 through the atmosphere opening port 401 (refer to a lower left portion in FIG. 20). Thereafter, by welding the new sealing film FLe2 to the partition wall PT401 defining the atmosphere opening port 401, the atmosphere opening port 401 can be sealed again, and the liquid storage container IC can be in a state suitable for the flow (refer to a lower right portion in FIG. 20). Then, by setting the height H401*a* of the partition wall PT401*a* in the protrusion direction and the height H401*o* of the partition wall PT401*o* in the protrusion direction to sufficient sizes, the new sealing film FLe is welded to the same liquid storage container IC, so that the processing of sealing the atmosphere opening port 401 can be performed a plurality of times.

In the present embodiment, the height H401*a* of the partition wall PT401*a* in the protrusion direction after the sealing film FLe1 is welded is, specifically, substantially 2.5 times the height H403*o* of the partition wall PT403*a* in the protrusion direction (refer to a right portion in FIG. 19 and an upper right portion in FIG. 20). With such a configuration, the new sealing film FLe2 is welded to the same liquid storage container IC, so that the processing of sealing again the atmosphere opening port 401 defined by the partition wall PT401 can be performed twice or more.

The ink in the present embodiment is also referred to as "liquid". The recess portion R200 constituting the liquid supply port 200, the recess portion R401 constituting the atmosphere opening port 401, and the recess portion R4C2 constituting the second area 4C2 of the capturing portion 4C are also referred to as a "first recess portion". The partition wall PT200 defining the liquid supply port 200, the partition wall PT401 defining the atmosphere opening port 401, and the peripheral wall 1404 defining the second area 4C2 of the capturing portion 4C are also referred to as a "first partition wall". The recess portion R403 constituting the bent flow path portion 403 is also referred to as a "second recess portion". The partition wall PT403 defining the bent flow path portion 403 is also referred to as a "second partition wall". The dimension H200 of the partition wall PT200, the dimension H401 of the partition wall PT401, and the dimension H4C2 of the peripheral wall 1404 are also referred to as a "first dimension". The dimension H403 of the partition wall PT403 is also referred to as a "second dimension".

The circular opening 4130 in the present embodiment is also referred to as an "opening". The pair of flow path portions 403*a* and 403*b* are also referred to as "a pair of first flow path portions". The flow hole 402 is also referred to as a "second flow path portion". The sealing film FLe1 is also referred to as a "first film". The first partition wall film FLp1 is also referred to as a "second film". The second partition wall film FLp2 is also referred to as a "third film".

B. Second Embodiment

In the second embodiment, the configurations of a first partition wall film FLp1*b* and a second partition wall film FLp2*b* are different from the configurations of the first partition wall film FLp1 and the second partition wall film FLp2 of the first embodiment. Then, the processing in the steps S100 and S600 in FIG. 12 is different from that in the first embodiment. Other aspects of the second embodiment are the same as those of the first embodiment.

Figure 21:
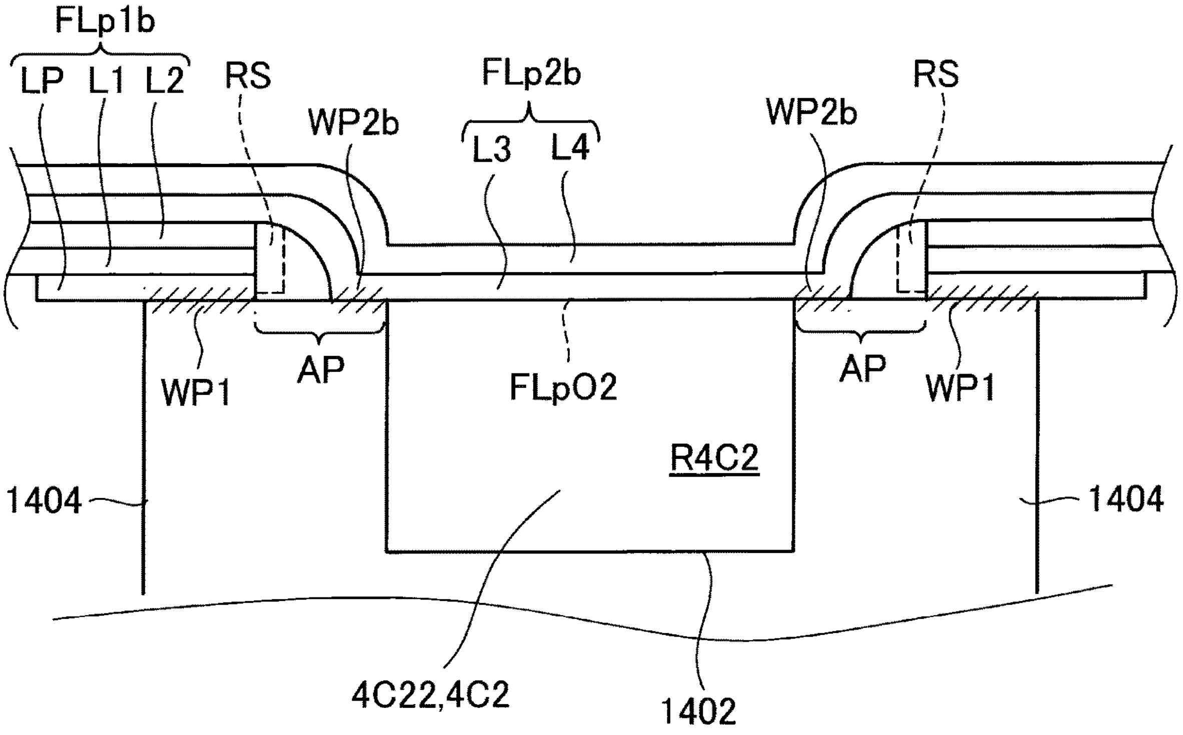
FIG. 21 is an explanatory view illustrating a state in the vicinity of the through hole of the partition wall film after processing of the step S600 in FIG. 12.

FIG. 21 is an explanatory view illustrating a state in the vicinity of the through hole FLpO of the partition wall film FLp after processing of the step S600 in FIG. 12.

The first partition wall film FLp1*b* of the second embodiment includes a separation portion FLp1*p*. The separation portion FLp1*p* is a portion that is cut off from other portions of the first partition wall film FLp1*b*. The separation portion FLp1*p* has a shape similar to the oval second area 4C22 surrounded by the peripheral wall 1404 in the capturing portion 4C (refer to FIG. 11).

The separation portion FLp1*p* is surrounded by a groove-shaped portion RS composed to be thinner than other portions in the first partition wall film FLp1*b*. The groove portion RS defining the outer shape of the separation portion FLp1*p* is on the upper end of the peripheral wall 1404 in a state in which the first partition wall film FLp1*b* is welded to the casing 900. The separation portion FLp1*p* is cut off from other portions of the first partition wall film FLp1*b* in the groove portion RS. In FIG. 21, the groove portion RS is indicated by a broken line. In FIGS. 1 and 2, the separation portion FLp1*p* is indicated by a broken line.

The first partition wall film FLp1*b* of the second embodiment also includes the first layer L1 and the second layer L2. Further, the first partition wall film FLp1*b* includes a peeling layer LP on the side opposite to the first layer L1 with respect to the second layer L2.

The peeling layer LP is a layer welded to the peripheral wall 1404. The peeling layer LP is provided only in a portion of the area of the first partition wall film FLp1*b*, including the separation portion FLp1*p* (refer to an upper left portion in FIG. 21). For example, the peeling layer LP is not provided in a portion facing the partition wall PT403 defining the bent flow path portion 403. In FIG. 2, the portion in which the peeling layer LP is provided is indicated by a broken line.

The peeling layer LP is made of a material containing the same component as the resin constituting the peripheral wall 1404 and a component different from the resin constituting the peripheral wall 1404. More specifically, the first layer L1 is made of a material containing polypropylene and a component other than polypropylene.

The first layer L1 is a layer that is welded to the casing 900 in a portion in which the peeling layer LP is not provided. For example, the first layer L1 is welded to the partition wall PT403 defining the bent flow path portion 403. The first layer L1 is made of the same resin as the resin constituting the peripheral wall 1404.

With the above configuration, in the area in which the separation portion FLp1*p* is provided, the first partition wall film FLp1*b* is not firmly welded to the peripheral wall 1404 as compared with the aspect in which the first layer L1 is welded to the peripheral wall 1404. As a result, the separation portion FLp1*p* of the first partition wall film FLp1*b* can be cut off from other portions and easily peeled off from the peripheral wall 1404.

The second layer L2 is a layer exposed to the outside of the liquid storage container IC. The configuration of the second layer L2 is the same as that of the first embodiment. That is, the second layer L2 is made of polyethylene terephthalate having a higher melting point than the materials of the first layer L1 and the peeling layer LP. However, the groove portion RS defining the outer shape of the separation portion FLp1*p* is open in the second layer L2 and reaches the peeling layer LP (refer to a middle portion in FIG. 21). That is, the groove portion RS defining the outer shape of the separation portion FLp1*p* has a bottom portion in the peeling layer LP.

In the second embodiment, the third layer L3 of the second partition wall film FLp2*b* is made of a material containing the same component as the resin constituting the peripheral wall 1404 and a component different from the resin constituting the peripheral wall 1404. More specifically, the first layer L1 is made of a material containing polypropylene and a component other than polypropylene. Other aspects of the second partition wall film FLp2 are the same as those of the second partition wall film FLp2 in the first embodiment.

In the step S100 in FIG. 12, the operator provides the through hole FLp02 in the partition wall film FLp. Specifically, the operator pushes the separation portion FLp1*p* into the second area 4C22, and cuts off the separation portion FLp1*p* from the partition wall film FLp along the groove portion RS. Thereafter, the separation portion FLp1*p* is peeled off from the upper end of the peripheral wall 1404. As a result, the through hole FLp02 including the opening of the second area 4C2 of the capturing portion 4C is provided in the partition wall film FLp (refer to a center portion in FIG. 21). In addition, in the upper end surface of the peripheral wall 1404, an area AP in contact with the inner peripheral surface of the peripheral wall 1404 defining the second area 4C2 of the capturing portion 4C and surrounding the opening of the second area 4C2 is exposed (refer to a middle portion in FIG. 21). In the upper end surfaces of the peripheral wall 1404, the welded first partition wall film FLp1*b* remains in an area in contact with the outer peripheral surface of the peripheral wall 1404 and surrounding the opening of the second area 4C2. In FIG. 21, a portion in which the partition wall film FLp remains on the upper end surface of the peripheral wall 1404 is illustrated as the welding portion WP1.

The liquid storage chambers 117 and 121 are refilled with ink through the through hole FLp02 provided in this way (refer to the step S200 to step S400 in FIG. 12).

In the step S600 in FIG. 12, the operator seals the through hole FLp02 provided in the first partition wall film FLp1*b* as the partition wall film FLp with the second partition wall film FLp2*b*. Specifically, the operator disposes the second partition wall film FLp2 such that the third layer L3 of the second partition wall film FLp2*b* faces the exposed surface in the upper end surface of the peripheral wall 1404. Then, the operator heats the second partition wall film FLp2*b* while the second partition wall film FLp2*b* is pressed toward the peripheral wall 1404, and welds the third layer L3 of the second partition wall film FLp2*b* to the exposed surface in the upper end surface of the peripheral wall 1404. The welding portion between the third layer L3 of the second partition wall film FLp2 and the upper end surface of the peripheral wall 1404 is illustrated by hatching as a welding portion WP2*b* in FIG. 21.

In this state, the partition wall film FLp is composed by the first partition wall film FLp1 and the second partition wall film FLp2 (refer to a lower left portion in FIG. 2 and a lower right portion in FIG. 1).

In the present embodiment, the dimension H4C2 of the peripheral wall 1404 is larger than the dimension H403 of the partition wall PT403 defining the bent flow path portion 403 (refer to an upper center portion in FIG. 10 and a center portion in FIG. 11). Therefore, the portion FLp1*p* of the first partition wall film FLp1 welded to the peripheral wall 1404 surrounding the circular opening 4130 is peeled off, and after the ink is filled through the circular opening 4130, the new film FLp2 is welded to the peripheral wall 1404, so that the second area 4C2 can be composed again by the new second partition wall film FLp2. Then, by setting the dimension H4C2 of the peripheral wall 1404 to a sufficient size, a new film is welded to the same liquid storage container IC, so that the processing of constituting the second area 4C2 again can be performed a plurality of times.

In the present embodiment, the third layer L3 of the second partition wall film FLp2*b* is made of a material containing the same component as the resin constituting the peripheral wall 1404 and a component different from the resin constituting the peripheral wall 1404. Therefore, the second partition wall film FLp2*b* can be easily peeled off from the peripheral wall 1404 later. As a result, by welding the new second partition wall film FLp2*b* to the same liquid storage container IC, the processing of constituting the second area 4C2 again can be performed a plurality of times.

In the present embodiment, the portion of the partition wall film FLp provided with the peeling layer LP is also referred to as a "second film" (refer to FIGS. 2 and 21).

C. Other Embodiments

C1. Another Embodiment 1

1. In the above embodiment, the sealing film FLe is welded to the partition wall PT401 that defines the atmosphere opening port 401 (refer to FIG. 20). However, the sealing film FLe may have a layer of a peelable urethane adhesive on the surface, and may be peelably attached to the casing 900 by the urethane adhesive.

2. In the second embodiment, the portion of the partition wall film FLp including the peeling layer LP corresponds to the "second film" welded to the second partition wall, and the portion of the partition wall film FLp not including the peeling layer LP corresponds to the "first film" welded to the first partition wall having a dimension larger than that of the second partition wall (refer to FIGS. 2 and 21). The "first film" and the "second film" may be different films such as the sealing film FLe and the first partition wall film FLp1 in the first embodiment, or as in the second embodiment, may be different portions of the same film having different configurations from each other.
3. In the above embodiment, the recess portion R403 constituting the bent flow path portion 403 corresponds to the "second recess portion" defined by the second partition wall having a dimension smaller than that of the first partition wall (refer to FIG. 19). However, in the liquid storage container, instead of the recess portion R403 or in addition to the recess portion R403, an aspect can be adopted in which the recess portion R117 and the recess portion R121 constituting the liquid storage chambers 117 and 121 correspond to the "second recess portion". In such an aspect, the partition wall PT117 and the partition wall PT121 that respectively define the recess portion R117 and the recess portion R121 correspond to the second partition wall having a dimension smaller than that of the first partition wall.
4. In the above embodiment, the cross-sectional area of the flow path portions 403*a* and 403*b* is smaller than the cross-sectional area of the flow hole 402 of the atmosphere introduction path 400 coupled to the flow path portions 403*a* and 403*b* (refer to an upper left portion of FIG. 3 and an upper left portion of FIG. 7). In addition, the cross-sectional area of the flow path portions 403*a* and 403*b* is smaller than the cross-sectional area of the space surrounded by the wall surrounding the flow hole 405 and sealed by the ventilation film FLv in the cross section perpendicular to the direction of the flow path (refer to an upper center portion of 3). The space surrounded by the wall surrounding the flow hole 405 and sealed by the ventilation film FLv is coupled to the flow path portions 403*a* and 403*b* via other portions of the bent flow path portion 403. That is, a pair of first flow path portions coupled to each other and allowing air to flow in an opposite direction may have a smaller cross-sectional area than the other flow path portion of the atmosphere introduction path directly or indirectly coupled to the pair of first flow path portions.
5. In the above embodiment, the circular opening 4130 provided in the wall portion 1402 constituting a portion of the liquid storage container IC has a circular outer shape (refer to FIG. 11). The opening coupling to the second area 4C22 and the first area 413 may have other shapes such as a triangular shape or a quadrangular shape.

C2. Another Embodiment 2

In the above embodiment, the first layer FLe11 of the sealing film FLe is made of a material containing polypropylene and a component other than polypropylene. However, the first layer FLe11 of the sealing film FLe may be made of other materials. For example, the first layer FLe11 may be made of the same component as the resin constituting the partition wall PT401. However, the first layer FLe11 may be made of materials containing the same component as the resin constituting the partition wall PT401 and a component different from the resin constituting the partition wall PT401 defining the atmosphere opening port 401.

C3. Another Embodiment 3

In the above embodiment, the first layer L1 of the first partition wall film FLp1 is made of polypropylene (FIG. 17). That is, the first layer L1 is made of the same resin as the resin constituting the partition wall PT403 that defines the bent flow path portion 403. However, the first layer L1 of the first partition wall film FLp1 may contain a component different from the resin constituting the partition wall PT403.

C4. Another Embodiment 4

In the above embodiment, the height H401*a* of the partition wall PT401*a* in the protrusion direction is substantially 2.5 times the height H4030 of the partition wall PT403*a* in the protrusion direction (refer to a right portion in FIG. 19 and an upper right portion in FIG. 20). That is, the height H401*a* of the partition wall PT401*a* in the protrusion direction is larger than two times the height H4030 of the partition wall PT403*a* in the protrusion direction. However, the dimension of the first partition wall may be another size such as three times or four times the dimension of the second partition wall. In addition, the dimension of the first partition wall may be the same as or may be smaller than the dimension of the second partition wall.

C5. Another Embodiment 5

In the above embodiment, after the processing of FIGS. 12 and 18, the liquid storage container IC has an aspect including the second partition wall film FLp2 that is disposed on the side opposite to the peripheral wall 1404 with respect to the first partition wall film FLp1 and is welded to the peripheral wall 1404 (refer to FIGS. 1 and 17). On the other hand, the liquid storage container IC does not include the second partition wall film FLp2 in a newly produced state. In addition, in the aspect in which a hole is provided in the casing 900 of the liquid storage container IC to refill with the liquid, the liquid storage container IC may not include the second partition wall film FLp2 even after the liquid is refilled. Also in such an aspect, the sealing film FLe may be re-welded to the partition wall PT401. The supply port film FLsp may be re-welded to the partition wall PT200.

C6. Another Embodiment 6

In the above embodiment, the bent flow path portion 403 is positioned between the capturing portion 4C and the ventilation film FLv in the atmosphere introduction path 400 (refer to an upper left portion in FIG. 3 and an upper left portion in FIG. 7). However, in the atmosphere introduction path 400, the capturing portion 4C may be on the side opposite to the liquid storage chambers 117 and 121 with respect to the bent flow path portion 403. In addition, the liquid storage container IC can have an aspect of not including the bent flow path portion 403.

D. Other Aspects

The present disclosure is not limited to the above-described embodiments and can be implemented with various aspects without departing from the spirit thereof. For example, the present disclosure can also be realized by the following aspects. For example, the technical features in the above-described embodiments corresponding to the technical features in each aspect described below are to solve some or all of the above-described problems of the present disclosure, or in order to achieve some or all of the above-described effects of the present disclosure, replacement or combination thereof can be performed as appropriate. In addition, unless the technical features are described as essential in the present specification, deletion is possible as appropriate.

1. According to an aspect of the present disclosure, there is provided a liquid storage container. The liquid storage container includes a casing that includes a plurality of recess portions at different portions, and a plurality of films welded to the casing to close the plurality of recess portions. The plurality of recess portions constitute a liquid storage chamber that stores liquid and a flow path that is coupled to the liquid storage chamber and through which at least one of the liquid and air flows. The casing includes a first partition wall that defines a first recess portion among the plurality of recess portions and to which a first film among the plurality of films is welded, and a second partition wall that defines a second recess portion among the plurality of recess portions and to which a second film among the plurality of films is welded. A first dimension, which is a dimension of a portion of the first partition wall protruding toward the first film from a configuration coupled to the first partition wall, is greater than a second dimension, which is a dimension of a portion of the second partition wall protruding toward the second film from a configuration coupled to the second partition wall.

With such an aspect, it is easier to weld a new film to the first partition wall as compared with the aspect in which the first dimension and the second dimension are equal to each other. Therefore, by providing a hole in the first film or peeling off the first film from the first partition wall, the new film is welded to the first partition wall, so that the flow path or the liquid storage chamber defined by the first partition wall can be composed or sealed again by the new film. Then, by setting the first dimension to a sufficient size, the new film is welded to the same liquid storage container, so that the processing of constituting or sealing the flow path or the liquid storage chamber defined by the first partition wall again can be performed a plurality of times.

2. In the liquid storage container according to the above aspect, an aspect can be adopted in which the first recess portion is an atmosphere opening port to introduce atmosphere into the liquid storage chamber.

In such an aspect, the liquid storage container can flow in a state in which the atmosphere opening port is closed by the first film. Then, by peeling off the first film from the first partition wall, the liquid storage container can be used in a state in which the atmosphere can be introduced into the liquid storage chamber through the atmosphere opening port. Thereafter, by welding a new film to the first partition wall, the atmosphere opening port can be sealed again, and the liquid storage container can be in a state suitable for the flow. Then, by setting the first dimension to a sufficient size, the new film is welded to the same liquid storage container, so that the processing of sealing the atmosphere opening port can be performed a plurality of times.

3. In the liquid storage container according to the above aspect, an aspect can be adopted in which the casing includes an atmosphere opening port to introduce atmosphere into the liquid storage chamber, the flow path includes an atmosphere introduction path that couples the atmosphere opening port to the liquid storage chamber, the atmosphere introduction path includes one or more cylindrical spaces and a capturing portion that includes a first area in which air introduced from the atmosphere opening port flows into the cylindrical space and a second area that extends in a different direction from the first area and is coupled to the first area via an opening provided in a wall portion constituting a portion of the casing, the first recess portion constitutes the second area, and the first partition wall protrudes from the wall portion provided with the opening and is provided to surround the opening.

With such an aspect, for example, the first film welded to the first partition wall surrounding the opening is peeled off, and after the liquid is filled through the opening, a new film is welded to the first partition wall, so that the second area can be composed again by the new film. Then, by setting the first dimension to a sufficient size, the new film is welded to the same liquid storage container, so that the processing of constituting or sealing the second area again can be performed a plurality of times.

4. In the liquid storage container according to the above aspect, an aspect can be adopted in which the first recess portion is a liquid supply port that supplies the liquid in the liquid storage chamber to an outside of the liquid storage container.

In such an aspect, the liquid storage container can flow in a state in which the liquid supply port is closed by the first film, and by peeling off the first film from the first partition wall, the liquid storage container can be used in a state in which the liquid can be supplied from the liquid storage chamber to the outside via the liquid supply port. Thereafter, by welding a new film to the first partition wall, the liquid supply port can be sealed again, and the liquid storage container can be in a state suitable for the flow. Then, by setting the first dimension to a sufficient size, the new film is welded to the same liquid storage container, so that the processing of sealing the liquid supply port can be performed a plurality of times.

5. In the liquid storage container of the above aspect, an aspect can be adopted in which the casing includes an atmosphere opening port to introduce atmosphere into the liquid storage chamber, the flow path includes an atmosphere introduction path that couples the atmosphere opening port to the liquid storage chamber, the atmosphere introduction path includes a pair of first flow path portions that are coupled to one another for air to flow in an opposite direction and have a smaller cross-sectional area than a second flow path portion of the atmosphere introduction path directly or indirectly coupled to the pair of first flow path portions, and the second recess portion constitutes the pair of first flow path portions.

6. In the liquid storage container according to the above aspect, an aspect can be adopted in which the second recess portion constitutes the liquid storage chamber.

7. In the liquid storage container according to the above aspect, an aspect can be adopted in which the first film includes a first layer welded to the first partition wall and a second layer exposed to an outside of the liquid storage container, the first layer is made of a material containing the same component as a resin constituting the first partition wall and a component different from the resin constituting the first partition wall, and the second layer is made of a material having a higher melting point than the first layer.

With such an aspect, the first film can be easily peeled off from the first partition wall.

8. In the liquid storage container of the above aspect, an aspect can be adopted in which the second film includes a first layer welded to the second partition wall and a second layer exposed to an outside of the liquid storage container, the first layer is made of the same resin as a resin constituting the second partition wall, and the second layer is made of a material having a higher melting point than the first layer.

With such an aspect, the second film is firmly welded to the second partition wall as compared with the aspect in which the first layer of the second film is made of a material different from the resin constituting the second partition wall.

9. In the liquid storage container of the above aspect, an aspect can be adopted in which the first dimension is greater than twice the second dimension.

With such an aspect, the new film is welded to the same liquid storage container, so that the processing of constituting or sealing the flow path or the liquid storage chamber defined by the first partition wall again can be performed a plurality of times.

10. In the liquid storage container of the above aspect, a third film disposed on a side opposite to the first partition wall with respect to the first film and welded to the first partition wall is further included.

An aspect can be adopted in which the first film includes a through hole, and the third film covers the through hole of the first film.

11. In the liquid storage container of the above aspect, an aspect can be adopted in which the casing includes an atmosphere opening port to introduce atmosphere into the liquid storage chamber, the flow path includes an atmosphere introduction path that couples the atmosphere opening port to the liquid storage chamber, the second recess portion constitutes a portion of the atmosphere introduction path, and the first recess portion constitutes another portion of the atmosphere introduction path, which is positioned between the portion of the atmosphere introduction path and the liquid storage chamber in the atmosphere introduction path.

In such an aspect, as compared with an aspect in which the first recess portion is on the side opposite to the liquid storage chamber with respect to the second recess portion in the atmosphere introduction path, by providing a hole in the first film or peeling off the first film from the first partition wall, the liquid storage chamber can be easily filled with liquid through the first recess portion.

12. According to another aspect of the present disclosure, there is provided a method of recycling a liquid storage container. The method includes preparing the liquid storage container and welding a new first film to the first partition wall.

In such an aspect, by providing a hole in the first film that has already been welded or peeling off the first film from the first partition wall, the new first film is welded to the first partition wall, so that the flow path or the liquid storage chamber defined by the first partition wall can be composed again by the new film. As a result, the liquid storage container can be recycled.

The present disclosure can also be realized in various aspects other than the liquid storage container and the method of recycling the liquid storage container. For example, it can be realized in forms of a method of storing liquid in a used liquid storage container, a liquid filling device, a method of controlling a liquid filling device, a computer program that realizes the method, a non-transitory recording medium that records the computer program, or the like.

What is claimed is:

1. A liquid storage container comprising:

a casing that includes a plurality of recess portions at different portions; and a plurality of films welded to the casing to close the plurality of recess portions, wherein the plurality of recess portions constitute a liquid storage chamber that stores liquid, and a flow path that is coupled to the liquid storage chamber and through which at least one of the liquid and air flows, the casing includes a first partition wall that defines a first recess portion among the plurality of recess portions and to which a first film among the plurality of films is welded, and a second partition wall that defines a second recess portion among the plurality of recess portions and to which a second film among the plurality of films is welded, and a first dimension, which is a height dimension of the first partition wall in a protruding direction toward the first film, is greater than a second dimension, which is a height dimension of the second partition wall in a protruding direction toward the second film, wherein the first recess portion defined by the first partition wall is an atmosphere opening port that opens to an outside of the casing and introduces atmospheric air into an inside of the casing including the liquid storage chamber.

2. The liquid storage container according to claim 1, wherein the flow path includes an atmosphere introduction path that couples the atmosphere opening port to the liquid storage chamber, the atmosphere introduction path includes one or more cylindrical spaces, and a capturing portion that includes a first area in which air introduced from the atmosphere opening port flows into the cylindrical space and a second area that extends in a different direction from the first area and is coupled to the first area via an opening provided in a wall portion constituting a portion of the casing, the first recess portion constitutes the second area, and the first partition wall protrudes from the wall portion provided with the opening and is provided to surround the opening.

3. The liquid storage container according to claim 1, wherein the first recess portion is a liquid supply port that supplies the liquid in the liquid storage chamber to an outside of the liquid storage container.

4. The liquid storage container according to claim 1, wherein the flow path includes an atmosphere introduction path that couples the atmosphere opening port to the liquid storage chamber, the atmosphere introduction path includes a pair of first flow path portions that are coupled to one another for air to flow in an opposite direction and have a smaller cross-sectional area than a second flow path portion of the atmosphere introduction path directly or indirectly coupled to the pair of first flow path portions, and the second recess portion constitutes the pair of first flow path portions.

5. The liquid storage container according to claim 1, wherein the second recess portion constitutes the liquid storage chamber.

6. The liquid storage container according to claim 1, wherein the first film includes a first layer welded to the first partition wall, and a second layer exposed to an outside of the liquid storage container, the first layer is made of a material containing the same component as a resin constituting the first partition wall and a component different from the resin constituting the first partition wall, and the second layer is made of a material having a higher melting point than the first layer.

7. The liquid storage container according to claim 1, wherein the second film includes a first layer welded to the second partition wall, and a second layer exposed to an outside of the liquid storage container, the first layer is made of the same resin as a resin constituting the second partition wall, and the second layer is made of a material having a higher melting point than the first layer.

8. The liquid storage container according to claim 1, wherein the first dimension is greater than twice the second dimension.

9. The liquid storage container according to claim 1, further comprising:

a third film disposed on a side opposite to the first partition wall with respect to the first film and welded to the first partition wall, wherein the first film includes a through hole, and the third film covers the through hole of the first film.

10. The liquid storage container according to claim 1, wherein the flow path includes an atmosphere introduction path that couples the atmosphere opening port to the liquid storage chamber, the second recess portion constitutes a portion of the atmosphere introduction path, and the first recess portion constitutes another portion of the atmosphere introduction path, which is positioned between the portion of the atmosphere introduction path and the liquid storage chamber in the atmosphere introduction path.

11. A method of recycling a liquid storage container, the method comprising:

preparing the liquid storage container according to claim 1; and welding a new first film to the first partition wall.

12. A liquid storage container comprising:

a casing that includes a plurality of recess portions at different portions; and a plurality of films welded to the casing to close the plurality of recess portions, wherein the plurality of recess portions constitute a liquid storage chamber that stores liquid, and a flow path that is coupled to the liquid storage chamber and through which at least one of the liquid and air flows, the casing includes a first partition wall that defines a first recess portion among the plurality of recess portions and to which a first film among the plurality of films is welded, and a second partition wall that defines a second recess portion among the plurality of recess portions and to which a second film among the plurality of films is welded, and a first dimension, which is a dimension of a portion of the first partition wall protruding toward the first film from a configuration coupled to the first partition wall, is greater than a second dimension, which is a dimension of a portion of the second partition wall protruding toward the second film from a configuration coupled to the second partition wall, wherein the first film includes a first layer welded to the first partition wall, and a second layer exposed to an outside of the liquid storage container, the first layer is made of a material containing the same component as a resin constituting the first partition wall and a component different from the resin constituting the first partition wall, and the second layer is made of a material having a higher melting point than the first layer.

13. A liquid storage container comprising:

a casing that includes a plurality of recess portions at different portions; and a plurality of films welded to the casing to close the plurality of recess portions, wherein the plurality of recess portions constitute a liquid storage chamber that stores liquid, and a flow path that is coupled to the liquid storage chamber and through which at least one of the liquid and air flows, the casing includes a first partition wall that defines a first recess portion among the plurality of recess portions and to which a first film among the plurality of films is welded, and a second partition wall that defines a second recess portion among the plurality of recess portions and to which a second film among the plurality of films is welded, and a first dimension, which is a dimension of a portion of the first partition wall protruding toward the first film from a configuration coupled to the first partition wall, is greater than a second dimension, which is a dimension of a portion of the second partition wall protruding toward the second film from a configuration coupled to the second partition wall, wherein the second film includes a first layer welded to the second partition wall, and a second layer exposed to an outside of the liquid storage container, the first layer is made of the same resin as a resin constituting the second partition wall, and the second layer is made of a material having a higher melting point than the first layer.

* * * * *